United States Patent
Shibuya et al.

(10) Patent No.: US 7,525,533 B2
(45) Date of Patent: Apr. 28, 2009

(54) AUDIO COMMUNICATION DEVICE AND AUDIO COMMUNICATION METHOD

(75) Inventors: Tsuneki Shibuya, Tokyo (JP); Shigeki Mori, Tokyo (JP); Ryo Tokushima, Kanagawa (JP); Kazuhiro Sakiyama, Saitama (JP); Satomi Tanaka, Kanagawa (JP); Hiroshi Ito, Saitama (JP); Reiko Uenaka, Tokyo (JP); Tomonari Murakami, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/525,810

(22) Filed: Sep. 25, 2006

(65) Prior Publication Data

US 2007/0087777 A1    Apr. 19, 2007

Related U.S. Application Data

(60) Provisional application No. 60/782,276, filed on Mar. 15, 2006.

(30) Foreign Application Priority Data

| Sep. 29, 2005 | (JP) | P2005-283335 |
| Nov. 28, 2005 | (JP) | P2005-342005 |
| Nov. 28, 2005 | (JP) | P2005-342006 |
| Nov. 28, 2005 | (JP) | P2005-342007 |

(51) Int. Cl.
    *G06F 3/033* (2006.01)
(52) U.S. Cl. ............... 345/163; 710/14; D14/402
(58) Field of Classification Search ......... 345/156–184; 200/6 B, 6 R, 7, 8 R, 9, 178–179
    See application file for complete search history.

(56) References Cited

U.S. PATENT DOCUMENTS

| 5,153,394 A * | 10/1992 | Abendroth et al. ........ 200/61.52 |
| 5,596,181 A * | 1/1997 | Bach et al. ................... 200/8 R |
| 5,706,031 A | 1/1998 | Brendzel et al. |
| 5,847,695 A | 12/1998 | Duncan et al. |
| 5,943,625 A | 8/1999 | Yeom et al. |
| 6,285,354 B1 * | 9/2001 | Revis ......................... 345/163 |
| 6,549,789 B1 * | 4/2003 | Kfoury ..................... 455/550.1 |
| 6,694,391 B2 | 2/2004 | Blood |
| 6,917,824 B2 * | 7/2005 | Kobayashi ................ 455/575.3 |
| 2005/0180592 A1 * | 8/2005 | Miura ......................... 381/401 |
| 2005/0258180 A1 * | 11/2005 | Lown .......................... 220/835 |
| 2005/0261040 A1 * | 11/2005 | Andersson et al. ....... 455/575.3 |
| 2006/0123146 A1 * | 6/2006 | Wu et al. ........................ 710/8 |
| 2006/0126280 A1 * | 6/2006 | Wu .............................. 361/681 |
| 2006/0288534 A1 * | 12/2006 | Lu ............................... 16/334 |

\* cited by examiner

*Primary Examiner*—Niketa I Patel
*Assistant Examiner*—Jonathan R. Plante
(74) *Attorney, Agent, or Firm*—Oblon, Spivak, McClelland, Maier & Neustadt, P.C.

(57) ABSTRACT

An audio communication apparatus including a communication unit configured to communicate with an external device, an input unit configured to input an operating signal for operating the external device; a microphone configured to collect sound, a speaker configured to output sound, and a control unit configured to transmit the sound input from the microphone to the external device via the communication unit and transmit an audio signal received via the communication unit to the speaker, and configured to be connected to the input unit and control enabling and disabling of a function of the input unit.

17 Claims, 19 Drawing Sheets

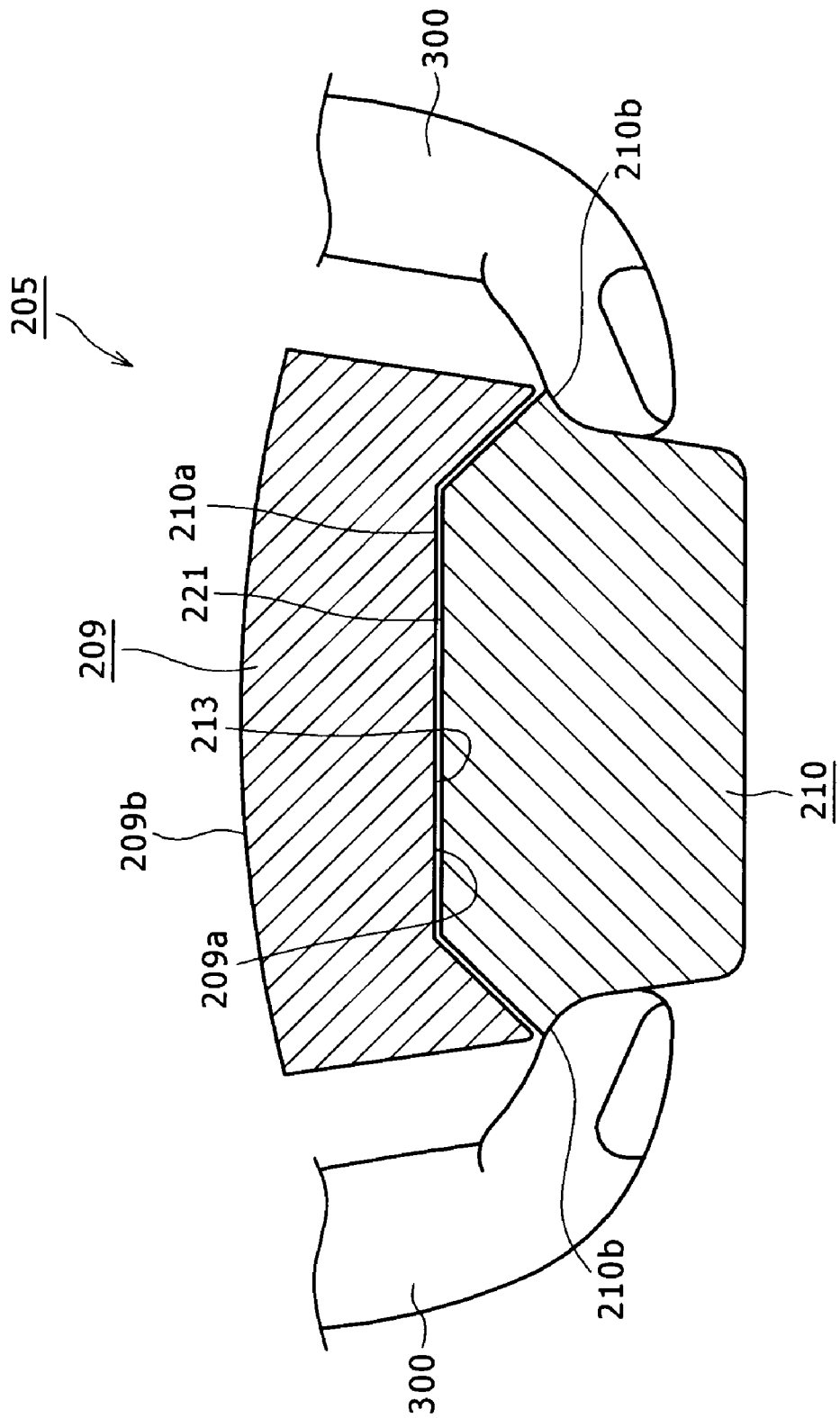

AUDIO COMMUNICATION DEVICE AND AUDIO COMMUNICATION METHOD

CROSS REFERENCES TO RELATED APPLICATIONS

This application claims the benefit to U.S. Provisional Patent Application 60/782,276 filed Mar. 15, 2006.

The present invention contains subject matter related to Japanese Patent Application JP 2005-283335, filed in the Japanese Patent Office on Sep. 29, 2005, Japanese Patent Application JP 2005-342005, filed in the Japanese Patent Office on Nov. 28, 2005, Japanese Patent Application JP 2005-342006, filed in the Japanese Patent Office on Nov. 28, 2005, Japanese Patent Application JP 2005-342007, filed in the Japanese Patent Office on Nov. 28, 2005, the entire contents of which being incorporated herein by reference.

BACKGROUND OF THE INVENTION

1. Field of the Invention

The present invention relates to an audio communication device and an audio communication method that are suitable for use in performing audio communication via a network using a computer apparatus.

2. Description of the Related Art

With the recent development of data communication networks such as the Internet and computer apparatuses, call service that allows audio communication to be performed with a specific person at another end of the communication in real time via a communication network has spread rapidly in place of a conventional telephone system in which audio communication is performed via a telephone switchboard. As such a call service that allows audio communication to be performed via a communication network, a service referred to as an IP telephone, in which a telephone call is made using IP (Internet Protocol) technology, is known.

In the IP telephone, voice in telephone conversation is converted to an analog audio signal by a predetermined audio device such for example as a microphone, further the analog audio signal is converted into digital audio data, and then the digital audio data is transmitted via a network. Digital audio data received via the network is converted to an analog audio signal, the analog audio signal is amplified by an amplifier, and then the amplified analog audio signal is output as audio using a predetermined audio device such as a speaker or the like. The IP telephone is used by a dedicated telephone set using a similar handset to that of a conventional telephone device, for example. In addition, the IP telephone can be used by utilizing a computer apparatus such as a personal computer or the like.

A case where the IP telephone is used by utilizing a personal computer will be described in brief with reference to FIG. 19. A computer apparatus 400 is for example a personal computer. The computer apparatus 400 is connected to the Internet by wire or by radio (not shown).

The computer apparatus 400 is connected with a mouse 410 as a pointing device. The mouse 410 has a USB (Universal Serial Bus) interface, for example, and is connected to a USB terminal provided to the computer apparatus 400. Recently, a mainstream operating system as an OS (Operating System) for the computer apparatus 400 implements an interface with a user using a GUI (Graphical User Interface). Therefore a pointing device such as the mouse 410 or the like for specifying an arbitrary position on a screen and operating a button or the like displayed on the screen is an indispensable input device for the computer apparatus 400.

A so-called notebook type personal computer as the computer apparatus 400 configured so as to be portable includes in advance a pointing device such as a touch pad for specifying a position by touching an area provided in a predetermined manner with a finger or the like, a trackball for specifying a position by rotating a ball disposed in such a manner as to be rotatable, or the like. Since the touch pad and the trackball make it difficult to finely specify a position and force movement somewhat unnatural for a human hand, many users use such a portable type personal computer with the mouse 410 connected to the personal computer.

On the other hand, many users consider it bothersome to carry the mouse 410 together with a portable personal computer. In order to solve such a problem, Japanese Patent Laid-open No. 2004-147272 describes a flip type portable telephone terminal formed so as to be divided at a hinge part with a side provided with a display element used as a mouse and a side provided with keys used as a ten key pad.

Returning to the description of FIG. 19, the computer apparatus 400 is further provided with a terminal for inputting and outputting analog audio signals. The terminal for inputting and outputting analog audio signals can be connected with a headset 411. The headset 411 has headphones 411A and a microphone 411B. The headset 411 can input sound collected by the microphone 411B as an analog audio signal to the computer apparatus 400, and reproduce an analog audio signal output from the computer apparatus 400 from the headphones 411A.

The computer apparatus 400 includes software for implementing an IP telephone on the computer apparatus. This software performs outgoing call processing and incoming call processing by the IP telephone, and performs telephonic communication by transmitting and receiving digital audio signals via the Internet.

When a user uses the IP telephone from the computer apparatus 400, the user has a telephone conversation using the headset 411. When calling, the user for example starts software for implementing the IP telephone on the computer apparatus 400, performs an off-hook operation on the software, and specifies a telephone number of a calling destination to thus perform a calling operation. After communication with the calling destination is established according to the calling operation, the user has a telephone conversation using the headset 411.

In the case of an incoming call, the software for implementing the IP telephone is started on the computer apparatus 400 and set in a standby state in advance. When there is an incoming call to the user, the software notifies the incoming call to the user by display on the screen of the computer apparatus 400, audio output and the like. When informed of the incoming call by the incoming call notification, the user performs an off-hook operation on the software, and has a telephone conversation using the headset 411.

SUMMARY OF THE INVENTION

When the user is to use the IP telephone on the computer apparatus 400 as described above, it is difficult for the user to be surely informed of an incoming call. Specifically, after starting the software for implementing the IP telephone, it is difficult for the user to listen to a ring tone when there is an incoming call unless the user wears the headset 411 with the headset 411 connected to the computer apparatus 400. When an incoming call is notified by display on the screen, the user has to look fixedly at the screen at all times, which is extremely inconvenient.

Recently, places where the Internet can be used by wire or by radio other than predetermined areas such as houses, offices and the like have been increasing. However, when carrying and using the portable type computer apparatus 400, it is difficult for the user to use the IP telephone unless the user also carries the headset 411. When using the portable type computer apparatus 400 with the mouse 410 connected to the computer apparatus 400, the user has to further carry the headset 411 together with the mouse 410, which is very bothersome.

It is desirable to provide an audio communication device and an audio communication method that make it possible to use the IP telephone from a computer apparatus more simply.

Further, the conventional device described in Japanese Patent Laid-open No. 2004-147272 needs a first casing having a speaker and a second casing having a microphone to be joined to each other when the device is used as a telephone and needs the first casing and the second casing to be separated from each other when the device is used as a mouse. The attachment and the detachment required when the device is used are troublesome and thus impair usability.

It is thus considered that as with a folding type portable telephone, the first casing and the second casing are joined to each other in such a manner as to be rotatable so that the telephone and the mouse are used properly according to a rotation angle, for example.

It is considered that in such proper use, for example, the device is used as a mouse in a folded state and the device is used as a telephone in an opened state obtained by rotation. However, if the first casing is unintentionally rotated in a direction of being opened with respect to the second casing when the device is used as a mouse, a telephone mode in which the device is used as a telephone may be set, thus resulting in an erroneous operation.

Thus, a mouse device that also performs a telephone function according to an embodiment of the present invention overcomes the above-described problems and prevents erroneous operation.

According to an embodiment of the present invention, there is provided an audio communication apparatus including: a communication unit configured to communicate with an external device; an input unit configured to input an operating signal for operating the external device; a microphone configured to collect sound; a speaker configured to output sound; and a control unit configured to transmit the sound input from the microphone to the external device via the communication unit and transmit an audio signal received via the communication unit to the speaker, and configured to be connected to the input unit and control enabling and disabling of a function of the input unit.

According to an embodiment of the present invention, there is provided an audio communication method of an audio communication apparatus in which a signal for operating an external device is input and which performs audio communication, the audio communication method including the steps of: inputting a signal for operating the external device; starting an audio signal communication; and disabling the inputting of the signal for operating the external device when the audio signal communication is performed.

As described above, enabling and disabling of a function of an input unit having at least a position detecting unit for performing position detection and a button input unit for performing pressing input is controlled from an audio signal processing unit for outputting an audio signal obtained by collecting sound by a microphone and outputting an input audio signal from a speaker. It is therefore possible to control the turning on/off of the function of the input unit according to a state of the audio signal processing unit.

In addition, enabling and disabling of a function of an input unit having at least a position detecting unit for performing position detection and a button input unit for performing pressing input is controlled from an audio signal processing unit for outputting an audio signal obtained by collecting sound by a microphone and outputting an input audio signal from a speaker, the audio signal output from the audio signal processing unit and transferred in such a manner as to be transferable together with at least output from the input unit and the audio signal to be input to the audio signal processing unit is transmitted to a network, and the audio signal transmitted via the network is transferred to the audio signal processing unit in such a manner as to be transferable together with at least the output from the input unit and the audio signal output from the audio signal processing unit. It is therefore possible to control the turning on/off of the function of the input unit according to a state of the transmission of the audio signal output from the audio signal processing unit via the network and the input of the received audio signal to the audio signal processing unit.

Further, in the mouse device that also performs a telephone function according to an embodiment of the present invention, a first casing is rotated with respect to a second casing between an opened position as one rotation end and a folded position as another rotation end, a ball or a light emitting and receiving device for detecting a direction of movement and a speed of movement is disposed in the second casing, a mouse mode allowing use of the mouse device as a mouse is set when a rotation angle of the first casing with respect to the second casing is in a range between a rotation angle at the folded position and a predetermined rotation angle, a telephone mode allowing use of the mouse device as a telephone is set when the rotation angle of the first casing with respect to the second casing is in a range between a rotation angle at the opened position and the predetermined rotation angle, and holding recess parts on which fingers are put when the mouse device is held in the mouse mode at least are formed on side parts of the second casing.

Thus, the mouse device that also performs a telephone function according to the above-described embodiment of the present invention facilitates the holding of the fingers to the holding recess parts when the mouse device is used as a mouse.

As described above, enabling and disabling of a function of an input unit having at least a position detecting unit for performing position detection and a button input unit for performing pressing input is controlled from an audio signal processing unit for outputting an audio signal obtained by collecting sound by a microphone and outputting an input audio signal from a speaker. The first invention and the second invention therefore have an effect of making it possible to control the turning on/off of the function of the input unit according to a state of the audio signal processing unit.

For example, there is an effect of enabling control to turn off the function of the input unit when an audio signal is input to the audio signal processing unit or when an audio signal is output from the audio signal processing unit, and to turn on the function of the input unit otherwise.

In addition, as described above, enabling and disabling of a function of an input unit having at least a position detecting unit for performing position detection and a button input unit for performing pressing input is controlled from an audio signal processing unit for outputting an audio signal obtained by collecting sound by a microphone and outputting an input audio signal from a speaker, the audio signal output from the audio signal processing unit and transferred in such a manner as to be transferable together with at least output from the input unit and the audio signal to be input to the audio signal processing unit is transmitted to a network, and the audio signal transmitted via the network is transferred to the audio signal processing unit in such a manner as to be transferable together with at least the output from the input unit and the audio signal output from the audio signal processing unit. The third invention and the fourth invention therefore have an effect of making it possible to control the turning on/off of the function of the input unit according to a state of the transmission of the audio signal output from the audio signal processing unit via the network and the input of the received audio signal to the audio signal processing unit.

For example, there is an effect of enabling control to turn off the function of the input unit when an audio signal input to the audio signal processing unit is transmitted via the network or when an audio signal received via the network is input to the audio signal processing unit, and to turn on the function of the input unit otherwise.

The mouse device that also performs a telephone function according to an embodiment of the present invention is a mouse device also performing a telephone function which device has a first casing and a second casing joined to each other in such a manner as to be rotatable via a hinge part and can be used as communication means having a microphone and a speaker, the mouse device wherein the first casing is rotated with respect to the second casing between an opened position as one rotation end and a folded position as another rotation end, a ball or a light emitting and receiving device for detecting a direction of movement and a speed of movement is disposed in the second casing, a mouse mode allowing use of the mouse device as a mouse is set when a rotation angle of the first casing with respect to the second casing is in a range between a rotation angle at the folded position and a predetermined rotation angle, a telephone mode allowing use of the mouse device as a telephone is set when the rotation angle of the first casing with respect to the second casing is in a range between a rotation angle at the opened position and the predetermined rotation angle, and holding recess parts on which fingers are put when the mouse device is held in the mouse mode at least are formed on side parts of the second casing.

Thus, when the mouse device is used as a mouse, it is possible to prevent an erroneous rotation of the first casing with respect to the second casing, and prevent the setting of the telephone mode by an accidental operation.

Further, according to an embodiment of the present invention, a clearance recess part having an opening on the second casing side is formed in a surface of the first casing which surface is opposed to the second casing in the folded position of the first casing, an arranging projection part to be inserted in the clearance recess part of the first casing in the folded position is formed on the second casing, and a circuit board is disposed inside the arranging projection part. It is therefore possible to secure a sufficient arranging space for the circuit board and further minimize the overall thickness of the mouse device.

BRIEF DESCRIPTION OF THE DRAWINGS

FIG. 6 is a schematic diagram showing an example of the mouse device being used as a mouse;

DETAILED DESCRIPTION OF THE PREFERRED EMBODIMENTS

An embodiment of the present invention will hereinafter be described with reference to the drawings. In the present invention, a mouse used in a state of being connected to a computer apparatus such as a personal computer or the like and a handset used for IP telephone service in which telephone communication is performed using an IP (Internet Protocol) technology are formed integrally with each other. The mouse-integrated type handset in which the mouse and the handset are formed integrally with each other is provided with audio signal processing means such for example as a DSP (Digital Signal Processor) for processing audio signals, so that processing associated with A/D conversion and D/A conversion of audio signals by IP telephone service is performed in the integrated constitution, and ring tone generating processing and the like are also performed.

Forming the mouse and the handset integrally with each other provides an advantage of unnecessity of separately carrying a headset for using IP telephone service, for example. In addition, a ring tone can be output from the computer apparatus side when an incoming call notification is received, so that a user can be surely informed of the incoming call.

Figure 1A:
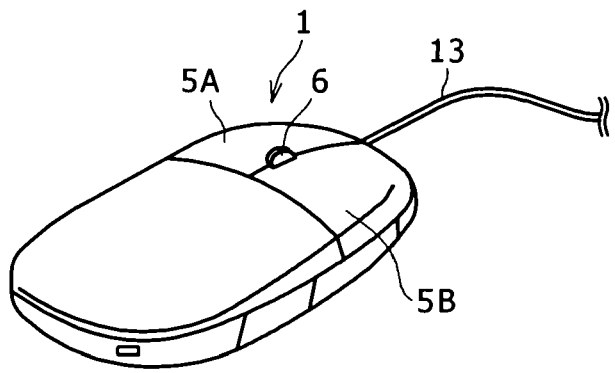
FIGS. 1A, 1B, and 1C are external views of an example of a mouse-integrated type handset according to one embodiment of the present invention.
Figure 1B:
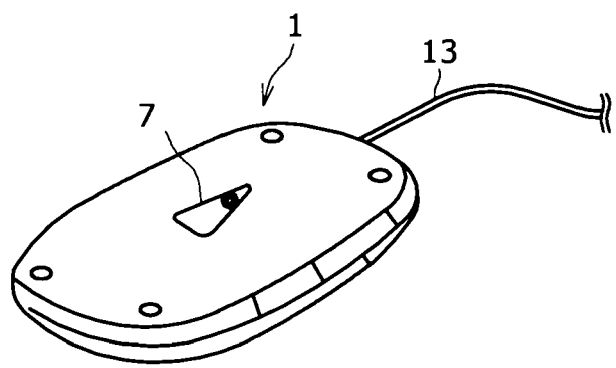
Figure 1C:
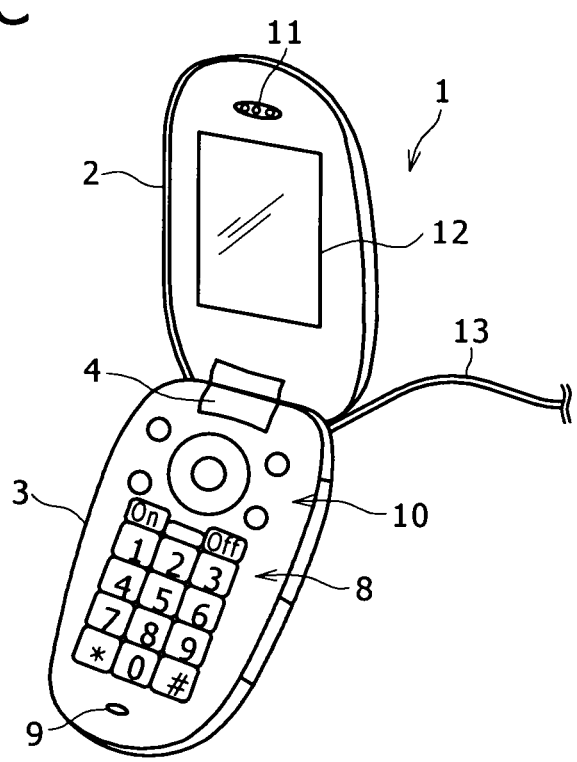

FIGS. 1A, 1B, and 1C show external appearances of an example of a mouse-integrated type handset 1 in which a mouse and a handset are formed integrally with each other according to an embodiment of the present invention. FIG. 1A is a perspective view of the mouse-integrated type handset 1 being used as a mouse. FIG. 1B is a perspective view from an underside, corresponding to FIG. 1A. FIG. 1C is a perspective view of an example of a state of the mouse-integrated type handset 1 being used as a handset.

As shown in FIG. 1C as an example, the mouse-integrated type handset 1 according to the present invention includes a cover part 2 and a main body part 3 joined to each other by a hinge part 4. The cover part 2 and the main body part 3 are joined to each other with the hinge part 4 as a pivot. The mouse-integrated type handset 1 in a state of a casing thereof being closed has a shape similar to that of an ordinary mouse, as shown in FIG. 1A as an example. On the other hand, as shown in FIG. 1C as an example, the mouse-integrated type handset 1 in a state of the casing thereof being opened has the shape of a handset with a receiver 11, a transmitter 9, and a key part 8 exposed, the receiver 11, the transmitter 9, and the key part 8 being provided on a closing side with respect to the pivot of the cover part 2 and the main body part 3 (the closing side will hereinafter be referred to simply as an "inside").

As shown in FIG. 1A as an example, mouse buttons 5A and 5B and a wheel 6 are provided on an upper surface side of the mouse-integrated type handset 1. While two mouse buttons are provided in this example, one mouse button may be provided depending on a supporting OS. It is possible to provide three mouse buttons or more. In addition, the wheel 6 can be omitted.

As shown in FIG. 1B as an example, a position sensor 7 is provided on the undersurface side of the mouse-integrated type handset 1. The position sensor 7 includes a light emitting part formed by an LED (Light Emitting Diode), for example, and an optical sensor formed by a PD (Photo Diode) or the like. The position sensor 7 receives reflected light of light emitted from the light emitting part by the optical sensor, and detects an amount of movement on the basis of change in the received light.

As shown in FIG. 1C as an example, the key part 8 and the transmitter 9 are provided on the main body part 3 side on the inside of the mouse-integrated type handset 1. The transmitter 9 includes a microphone. The transmitter 9 converts voice into an electric signal, and thereby generates an analog audio signal. The key part 8 includes keys generally used on the telephone, that is, keys for inputting numbers "0", "1", "2", "3", "4", "5", "6", "7", "8", and "9" and symbols "#" and "*", a call key ("On" key) for transmitting an outgoing call or starting a call in response to an incoming call, and a call ending key ("Off" key) for stopping the call and hanging up.

The receiver 11 is provided on the cover part 2 side. The receiver 11 includes a speaker. The receiver 11 outputs an analog audio signal supplied to the receiver 11 as audio. A display part 12 formed by a display element such for example as an LCD (Liquid Crystal Display) can be provided on the cover part 2 side.

Incidentally, an auxiliary key part 10 including various keys for assisting an IP telephone function, for example, can be provided on the main body part 3 side. For example, a sound volume key for adjusting the sound volume of voice output from the receiver 11 can be provided as a key of the auxiliary key part 10.

Though not shown in the figures, the mouse-integrated type handset 1 has detecting means for detecting whether the casing of the mouse-integrated type handset 1 is in an opened state or in a closed state. For example, a switch structure is incorporated into the hinge part 4 to detect the opened state or the closed state. The detecting means is not limited to this. A switch structure that is pressed when the cover part 2 and the main body part 3 are closed, for example, can be incorporated on the inside of the cover part 2 and the main body part 3. Further, an optical sensor can be provided on the inside of the cover part 2 and the main body part 3 to detect the opened state or the closed state on the basis of a difference between detected quantities of light.

This mouse-integrated type handset 1 uses a USB (Universal Serial Bus) as an interface for the computer apparatus. The mouse-integrated type handset 1 and the computer apparatus are connected to each other by a USB cable 13.

Specifically, a signal notifying an incoming call is supplied from the computer apparatus to the mouse-integrated type handset 1 via the USB cable 13. In addition, a signal corresponding to a key operation performed on the key part 8 of the mouse-integrated type handset 1, information on the opened state or the closed state of the casing, and the like are transmitted from the mouse-integrated type handset 1 to the computer apparatus via the USB cable 13. Further, digital audio data of a call is transmitted and received between the computer apparatus and the mouse-integrated type handset 1 via the USB cable 13.

Incidentally, while the USB cable 13 is connected to the hinge part side of the mouse-integrated type handset 1 in FIGS. 1A to 1C, this is not limited to this example. That is, the USB cable 13 may be connected to any position as long as the USB cable 13 is not connected to such a position as to obstruct operation as a mouse and operation as a handset of the mouse-integrated type handset 1. For example, the USB cable 13 can be connected to an end of the main body part 3 on an opposite side from the hinge part 4.

The structure of a mouse device that also performs a telephone function according to the present invention will hereinafter be described in detail with reference to accompanying drawings.

Figure 2:
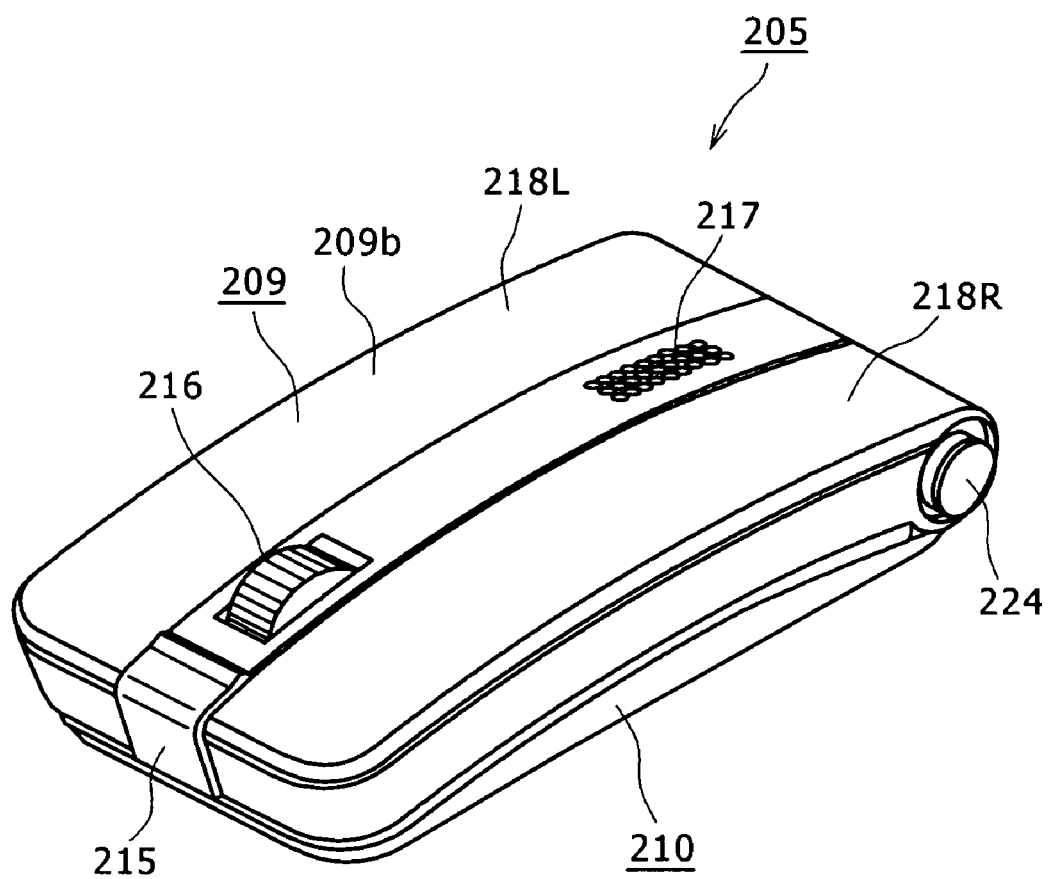
FIG. 2 is a perspective view of a mouse device in a state in which a first casing is in a folded position.
Figure 3:
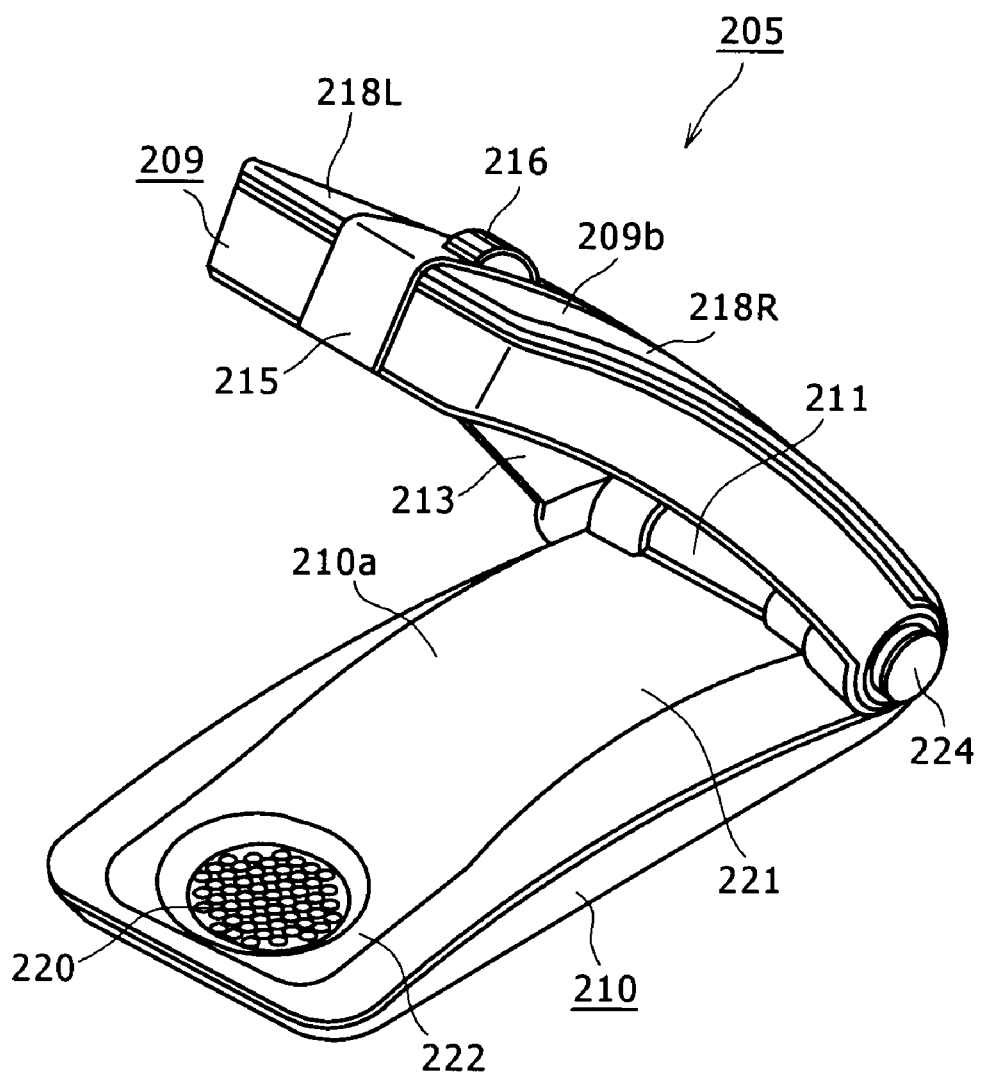
FIG. 3 is a perspective view of the mouse device in a state in which the first casing is in a position between the folded position and an opened position.
Figure 4:
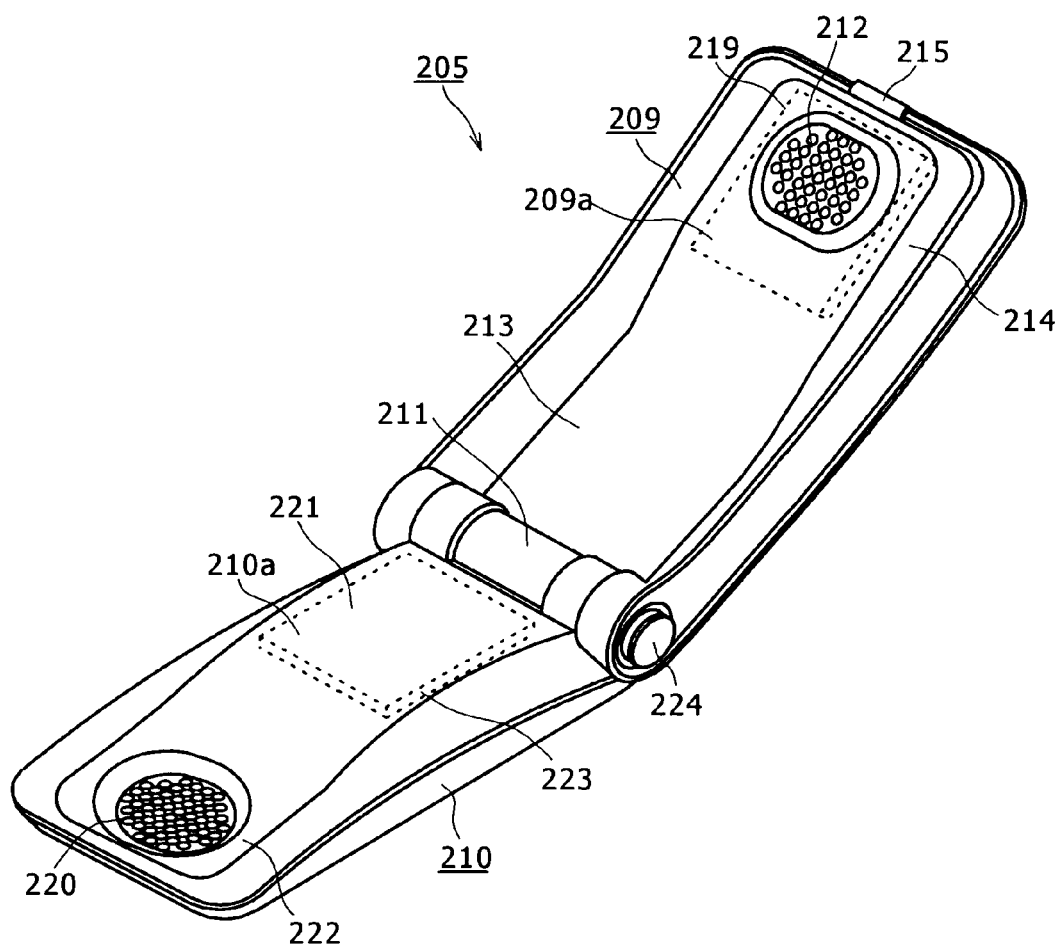
FIG. 4 is a perspective view of the mouse device in a state in which the first casing is in the opened position.

The mouse device 205 has a first casing 209 and a second casing 210 joined to each other in such a manner as to be rotatable via a hinge part 211, and is foldable (see FIGS. 2 to 4).

The mouse device 205 can be used as a mouse when a rotation angle of the first casing 209 with respect to the second casing 210 is less than a predetermined angle. The mouse device 205 can be used as a telephone when the rotation angle of the first casing 209 with respect to the second casing 210 is not less than the predetermined angle. When the rotation angle of the first casing 209 with respect to the second casing 210 is not less than the predetermined angle, a telephone mode in which the mouse device 205 can be used as a telephone is set, an application for using the mouse device 205 as a telephone is automatically started, and its display screen is displayed on a display (not shown).

The first casing 209 is rotated with respect to the second casing 210 between a folded position (see FIG. 2) and an opened position (see FIG. 4). The folded position is a state of the rotation angle of the first casing 209 with respect to the second casing 210 being about 0°. The opened position is a state of the rotation angle of the first casing 209 with respect to the second casing 210 being about 150°, for example.

The first casing 209 is formed into a flat and substantially rectangular shape, and is lengthened in a direction of connection to the second casing 210. A first speaker 212 is disposed in a surface of the first casing 209 which surface is opposed to the second casing 210 in the folded position, that is, an inner surface 209a (see FIG. 4). The first speaker 212 is disposed at an end part on an opposite side from the hinge part 211 in the inner surface 209a.

A clearance recess part 213 is formed in a part of the first casing 209 in which part the first speaker 212 is not disposed. The clearance recess part 213 has an opening on the second casing 210 side in the folded position. A part of the first casing 209 in which part the clearance recess part 213 is not disposed is provided as a board disposing part 214. The thickness of the board disposing part 214 is greater than the thickness of the clearance recess part 213.

A light emitting part 215 is disposed at an end part of the first casing 209 (see FIG. 2 and FIG. 3). The light emitting part 215 has a light emitting diode, for example, as a light source. The light emitting part 215 is for example turned on when the mouse device 205 is used as a mouse, is turned off when the mouse device 205 is used as a telephone, and blinks at the time of an incoming call.

A wheel 216 allowing a rotating operation thereof is disposed at a position close to the light emitting part 215 in an outer surface 209b of the first casing 209. The wheel 216 exerts a function of scrolling a display screen displayed on the display by a rotating operation when the mouse device 205 is used as a mouse, and exerts a function of adjusting sound volume by a rotating operation when the mouse device 205 is used as a telephone.

Thus, since operating means for performing the scrolling function and the sound volume adjusting function do not need to be provided separately from each other for the mouse device 205, it is possible to reduce the number of parts of the mouse device 205 and improve usability of the mouse device 205.

A second speaker 217 is disposed at an end part on the hinge part 211 side in the outer surface 209b of the first casing 209 (see FIG. 2). The second speaker 217 is disposed at a position near the hinge part 211. The position at which the second speaker 217 is disposed is difficult for a hand holding the mouse device 205 to cover when the user uses the mouse device 205 as a mouse. Thus, it is possible to prevent an inconvenience of the second speaker 217 being covered by a palm when a ring tone is output from the second speaker 217 in the folded position, as will be described later, so that it can be judged surely by ear that an incoming call is made.

A left button 218L and a right button 218R on sides opposite from each other with a center part interposed between the left button 218L and the right button 218R in a lateral direction (left-right direction) are disposed on the outer surface 209b of the first casing 209.

A control circuit board 219 is disposed inside the board disposing part 214 of the first casing 209 (see FIG. 4). The control circuit board 219 has a circuit for performing for example control related to the first speaker 212 and the second speaker 217 and control related to the left button 218L and the right button 218R.

The second casing 210 is formed into a flat and substantially rectangular shape having substantially the same size as the first casing 209, and is lengthened in a direction of connection to the first casing 209 (see FIGS. 2 to 4). The second casing 210 is a part placed on a tabletop or the like when the mouse device 205 is used as a mouse or used as a telephone in a hands-free state to be described later.

A microphone 220 is disposed in a surface of the second casing 210 which surface is opposed to the first casing 209 in the folded position, that is, an inner surface 210a (see FIG. 3 and FIG. 4). The microphone 220 is disposed at an end part on an opposite side from the hinge part 211 in the inner surface 210a.

A part of the second casing 210 in which part the microphone 220 is not disposed is provided as an arranging projection part 221. A part of the second casing 210 other than the arranging projection part 221 is provided as a thin part 222. The thickness of the arranging projection part 221 is greater than the thickness of the thin part 222.

In the folded position, the arranging projection part 221 of the second casing 210 is positioned in a state of being inserted in the clearance recess part 213 of the first casing 209, and the thin part 222 of the second casing 210 and the board disposing part 214 of the first casing 209 are positioned in an overlapping state.

Figure 5:
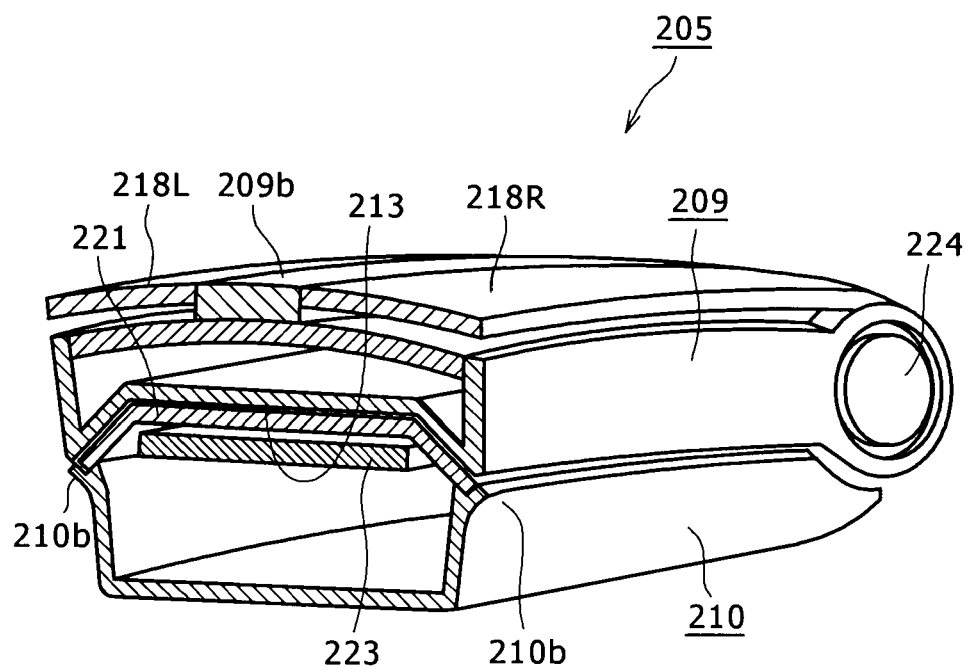
FIG. 5 is a schematic perspective view partly in section.

A circuit board 223 is disposed inside the arranging projection part 221 of the second casing 210 (see FIG. 4 and FIG. 5). The circuit board 223 has a circuit for performing for example control related to the microphone 220 and control related to a detection switch to be described later.

As described above, by projecting necessary parts of the first casing 209 and the second casing 210 and providing the parts as the board disposing part 214 and the arranging projection part 221, it is possible to minimize the overall thickness of the mouse device 205 while securing a sufficient arranging space for the control circuit board 219 and the circuit board 223.

In addition, by inserting the arranging projection part 221 of the second casing 210 into the clearance recess part 213 of the first casing 209 in the folded position, it is possible to prevent a positional displacement, especially a positional displacement in the lateral direction, of the first casing 209 with respect to the second casing 210 in the folded position.

A ball or a light emitting and receiving device not shown in the figures for detecting a direction of movement and a speed of movement of the mouse device 205 when the mouse device 205 is used as a mouse is disposed inside the second casing 210.

Holding recess parts 210b and 210b on which fingers are put when the mouse device 205 is held are formed on both of a left side part and a right side part, respectively, of the second casing 210 (see FIG. 5 and FIG. 6). The holding recess parts 210b and 210b are formed so as to extend in a direction of length of the second casing 210 in an upper end part of both of the left side part and the right side part of the second casing 210, and is formed in the shape of a gently curved plane that is displaced outward with increase in height.

The holding recess parts 210b and 210b are principally held by fingers 300 and 300 when the mouse device 205 is used as a mouse (see FIG. 6). Even if the user lifts the mouse device 205 when using the mouse device 205 as a mouse, the holding recess parts 210b and 210b function as a handle, thus preventing the first casing 209 from being rotated in a direction of being opened with respect to the second casing 210 and preventing a telephone mode from being set.

Thus, when the mouse device 205 is used as a mouse, it is possible to prevent the first casing 209 from being accidentally rotated with respect to the second casing 210 and prevent the telephone mode from being set by the accidental operation, and avoid an inconvenience of displaying an application associated with telephone use on the display 202 as a result of the accidental operation.

When the rotation angle of the first casing 209 with respect to the second casing 210 is a small angle, for example less than about 5°, the first casing 209 is biased toward the second casing 210 by a biasing spring not shown in the figures. On the other hand, when the rotation angle of the first casing 209 with respect to the second casing 210 is not less than about 5°, for example, the first casing 209 is biased away from the second casing 210 by a biasing spring not shown in the figures.

An opening button 224 is provided at one end part in an axial direction of the hinge part 211 (see FIGS. 2 to 4). When the opening button 224 is pressed in the folded position, the first casing 209 is rotated to a position of a rotation angle of about 50°, for example, with respect to the second casing 210 (see FIG. 3).

Figure 7A:
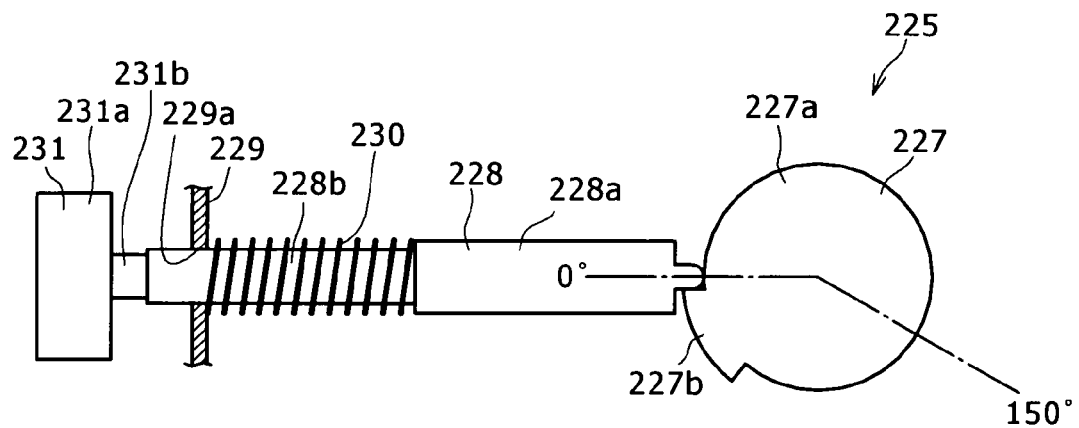
FIGS. 7A and 7B are enlarged side views of a state at a rotation angle of about 0° (folded position), the figure showing, together with FIGS. 8A to 11B, operating states of a opened/closed state detecting mechanism and an angle detecting mechanism when the first casing is rotated with respect to a second casing.
Figure 7B:
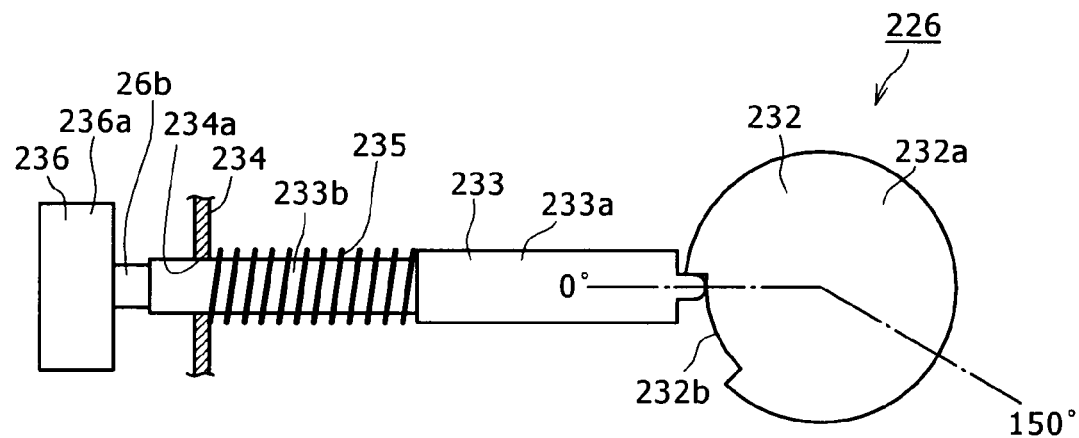

An opened/closed state detecting mechanism 225 and an angle detecting mechanism 226 are provided within the second casing 210 (see FIG. 7).

The opened/closed state detecting mechanism 225 has a rotating cam 227, an operating shaft 228, a supporting plate 229, a spring member 230, and an opened/closed state detecting switch 231.

The rotating cam 227 is formed by a disk part 227a and a cam projection part 227b projecting in a radial direction from a part of a peripheral surface of the disk part 227a. With the rotating operation of the first casing 209 with respect to the second casing 210, the rotating cam 227 is rotated in the same direction.

The operating shaft 228 is formed by a cam sliding contact part 228a and a supporting shaft part 228b. The outside diameter of the cam sliding contact part 228a is larger than the outside diameter of the supporting shaft part 228b. One end surface in an axial direction of the cam sliding contact part 228a is in sliding contact with the peripheral surface of the rotating cam 227.

An insertion hole 229a is formed in the supporting plate 229. The supporting shaft part 228b of the operating shaft 228 is inserted into the insertion hole 229a.

The spring member 230 is for example a compression coil spring. The spring member 230 is supported by the supporting shaft part 228b of the operating shaft 228. The spring member 230 is compressed between another end surface in the axial direction of the cam sliding contact part 228a and the supporting plate 229.

The opened/closed state detecting switch 231 has a main body 231a and a detecting shaft 231b moved with respect to the main body 231a. The opened/closed state detecting switch 231 is disposed at a position on an opposite side from the rotating cam 227 with the operating shaft 228 interposed between the opened/closed state detecting switch 231 and the rotating cam 227.

When the rotating cam 227 is rotated in the opened/closed state detecting mechanism 225, the operating shaft 228 is moved in the axial direction according to a position of contact of the cam sliding contact part 228a with the rotating cam 227.

When the cam sliding contact part 228a of the operating shaft 228 comes in contact with the cam projection part 227b of the rotating cam 227, the operating shaft 228 is moved in a direction of approaching the opened/closed state detecting switch 231 against biasing force of the spring member 230, and the detecting shaft 231b of the opened/closed state detecting switch 231 is pressed by the supporting shaft part 228b, so that the opened/closed state detecting switch 231 is set in an ON state. On the other hand, when the cam sliding contact part 228a of the operating shaft 228 comes in contact with the disk part 227a of the rotating cam 227, the operating shaft 228 is moved in a direction of going away from the opened/closed state detecting switch 231 by the biasing force of the spring member 230, and the detecting shaft 231b of the opened/closed state detecting switch 231 is released from the pressing of the supporting shaft part 228b, so that the opened/closed state detecting switch 231 is set in an OFF state.

In the opened/closed state detecting mechanism 225, the opened/closed state detecting switch 231 is in the OFF state when the rotation angle of the first casing 209 with respect to the second casing 210 is in a range of about 0° to about 5°, for example. The opened/closed state detecting switch 231 is in the ON state when the rotation angle of the first casing 209 with respect to the second casing 210 is in a range of about 5° to about 55°, for example. The opened/closed state detecting switch 231 is in the OFF state when the rotation angle of the first casing 209 with respect to the second casing 210 is in a range of about 55° to about 150°, for example.

The angle detecting mechanism 226 has a cam plate 232, a cam follower shaft 233, a supporting plate 234, a spring 235, and an angle detecting switch 236.

The cam plate 232 is formed by a disk part 232a and a cam recess part 232b formed in a part of a peripheral surface of the disk part 232a. With the rotating operation of the first casing 209 with respect to the second casing 210, the cam plate 232 is rotated in the same direction.

The cam follower shaft 233 is formed by a cam sliding contact part 233a and a supporting shaft part 233b. The outside diameter of the cam sliding contact part 233a is larger than the outside diameter of the supporting shaft part 233b. One end surface in an axial direction of the cam sliding contact part 233a is in sliding contact with the peripheral surface of the cam plate 232.

An insertion hole 234a is formed in the supporting plate 234. The supporting shaft part 233b of the cam follower shaft 233 is inserted into the insertion hole 234a.

The spring 235 is for example a compression coil spring. The spring 235 is supported by the supporting shaft part 233b of the cam follower shaft 233. The spring 235 is compressed between another end surface in the axial direction of the cam sliding contact part 233a and the supporting plate 234.

The angle detecting switch 236 has a main body 236a and a detecting shaft 236b moved with respect to the main body 236a. The angle detecting switch 236 is disposed at a position on an opposite side from the cam plate 232 with the cam follower shaft 233 interposed between the angle detecting switch 236 and the cam plate 232.

When the cam plate 232 is rotated in the angle detecting mechanism 226, the cam follower shaft 233 is moved in the axial direction according to a position of contact of the cam sliding contact part 233a with the cam plate 232.

When the cam sliding contact part 233a of the cam follower shaft 233 comes in contact with a peripheral surface of the disk part 232a of the cam plate 232, the cam follower shaft 233 is moved in a direction of approaching the angle detecting switch 236 against biasing force of the spring 235, and the detecting shaft 236b of the angle detecting switch 236 is pressed by the supporting shaft part 233b, so that the angle detecting switch 236 is set in an ON state. On the other hand, when the cam sliding contact part 233a of the cam follower shaft 233 comes in contact with the cam recess part 232b of the cam plate 232, the cam follower shaft 233 is moved in a direction of going away from the angle detecting switch 236 by the biasing force of the spring 235, and the detecting shaft 236b of the angle detecting switch 236 is released from the pressing of the supporting shaft part 233b, so that the angle detecting switch 236 is set in an OFF state.

In the angle detecting mechanism 226, the angle detecting switch 236 is in the OFF state when the rotation angle of the first casing 209 with respect to the second casing 210 is in a range of about 0° to about 45°, for example. The angle detecting switch 236 is in the ON state when the rotation angle of the first casing 209 with respect to the second casing 210 is in a range of about 45° to about 150°, for example.

Figure 20:
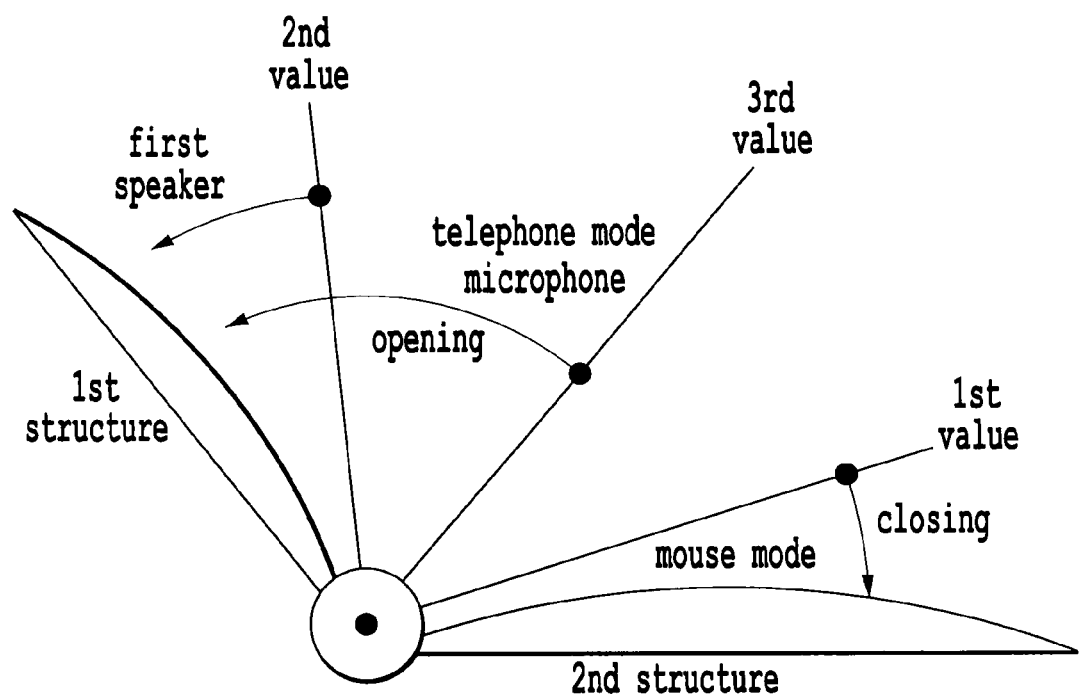
FIG. 20 is a side view of one embodiment of the present invention showing the rotation configurations described in FIG. 12.

Description will be made below of operation when the mouse device 205 is opened and closed, that is, when the first casing 209 is rotated with respect to the second casing 210 (see FIGS. 7 to 12). FIG. 12 is a chart diagram showing operations of parts. FIG. 20 is a side view of one embodiment of the invention in the various rotation configurations.

In the folded position (a rotation angle of about 0°), the opened/closed state detecting switch 231 and the angle detecting switch 236 are both in the OFF state (see FIG. 7 and FIG. 12), and the mode of the mouse device 205 is a mouse mode (see FIG. 12). Hence, the microphone 220, the first speaker 212, and the second speaker 217 are in an OFF state (disabled state).

When an incoming call is made in the folded position, the second speaker 217 is switched to an ON state to output a ring tone (see FIG. 12). At this time, as described above, the light emitting part 215 provided on the first casing 209 blinks. The ring tone is output from the second speaker 217, for example, until the first casing 209 is rotated to a predetermined rotation angle, for example a rotation angle of about 45°.

Figure 8A:
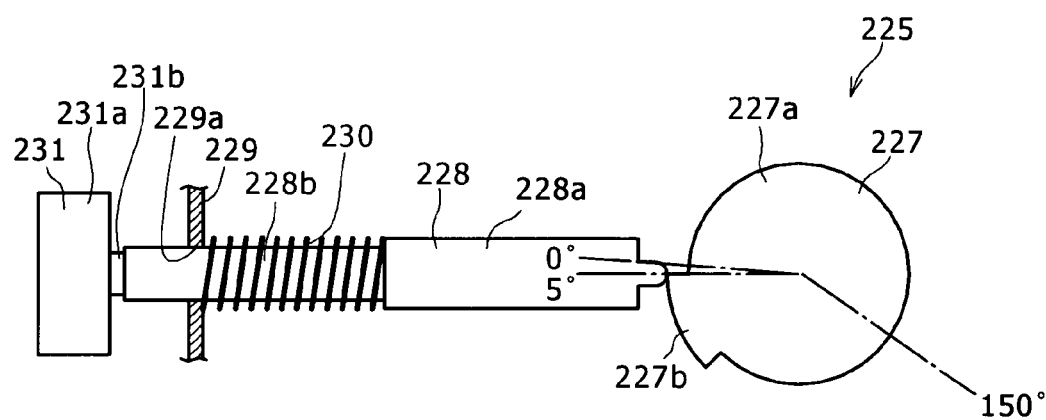
FIGS. 8A and 8B are enlarged side views of a state at a rotation angle of about 5°.
Figure 8B:
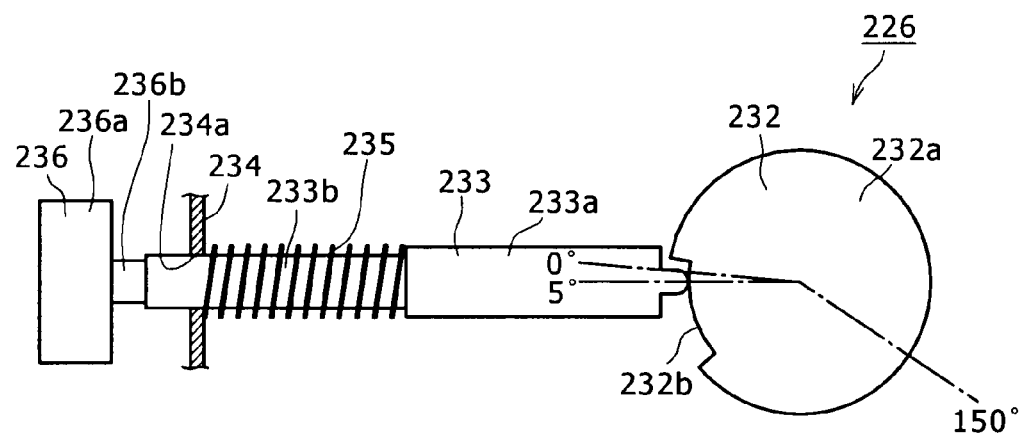

When the first casing 209 is rotated from the folded position to the opened position, the opened/closed state detecting switch 231 is set in an ON state at a rotation angle of about 5° (see FIG. 8 and FIG. 12).

Figure 9A:
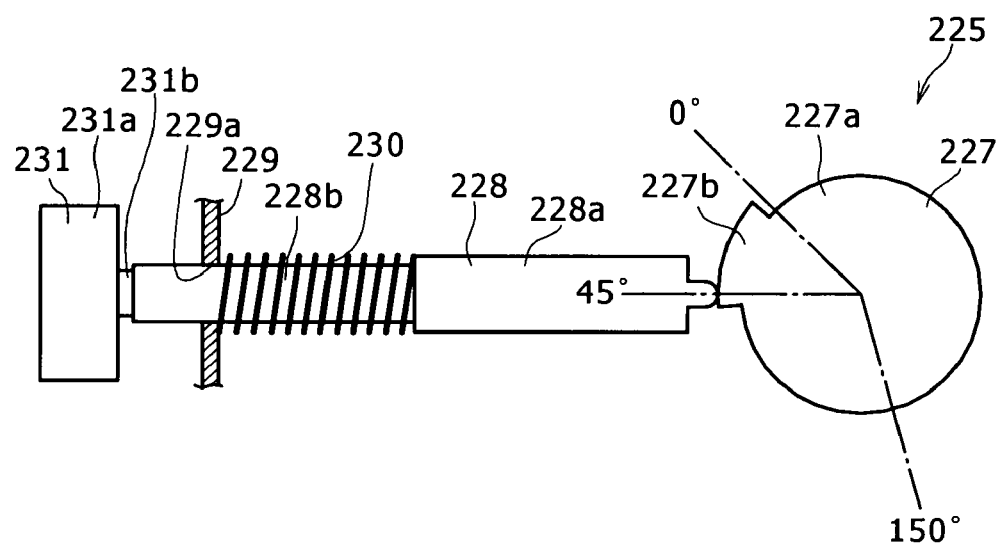
FIGS. 9A and 9B are enlarged side views of a state at a rotation angle of about 45°.
Figure 9B:
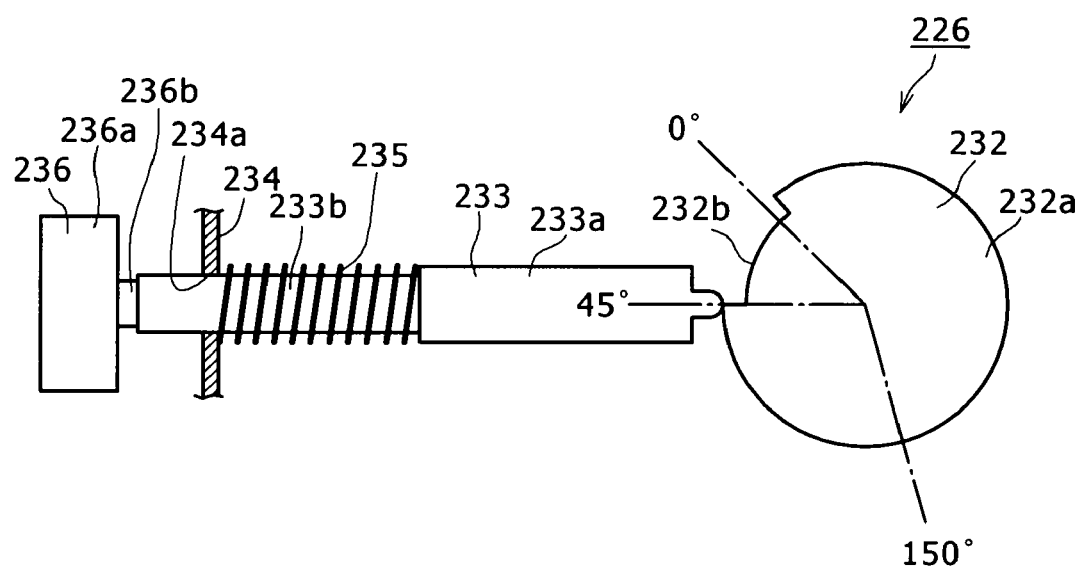

When the first casing 209 is further rotated toward the opened position, the angle detecting switch 236 is set in an ON state at a rotation angle of about 45° (see FIG. 9 and FIG. 12). Thus, the opened/closed state detecting switch 231 and the angle detecting switch 236 are both set in an ON state, and the mode of the mouse device 205 is switched from the mouse mode to the telephone mode (see FIG. 12). At the same time, the microphone 220 is set in an ON state to enable audio input. At this time, when there is an incoming call, the second speaker 217 is already set in the ON state to enable audio output, as described above, and when there is no incoming call, the second speaker 217 is switched from the OFF state to the ON state to enable audio output. Therefore the user can for example use the mouse device 205 as a telephone without holding the mouse device 205 with the mouse device 205 placed on a tabletop or the like in a so-called hands-free state.

Incidentally, as described above, by pressing the opening button 224 provided at one end part of the hinge part 211 in the mouse device 205, the first casing 209 is rotated to a rotation angle of about 50° with respect to the second casing 210 (see FIG. 3). The user can therefore use the mouse device 205 as a telephone in the so-called hands-free state at the rotation angle of about 50°.

Figure 10A:
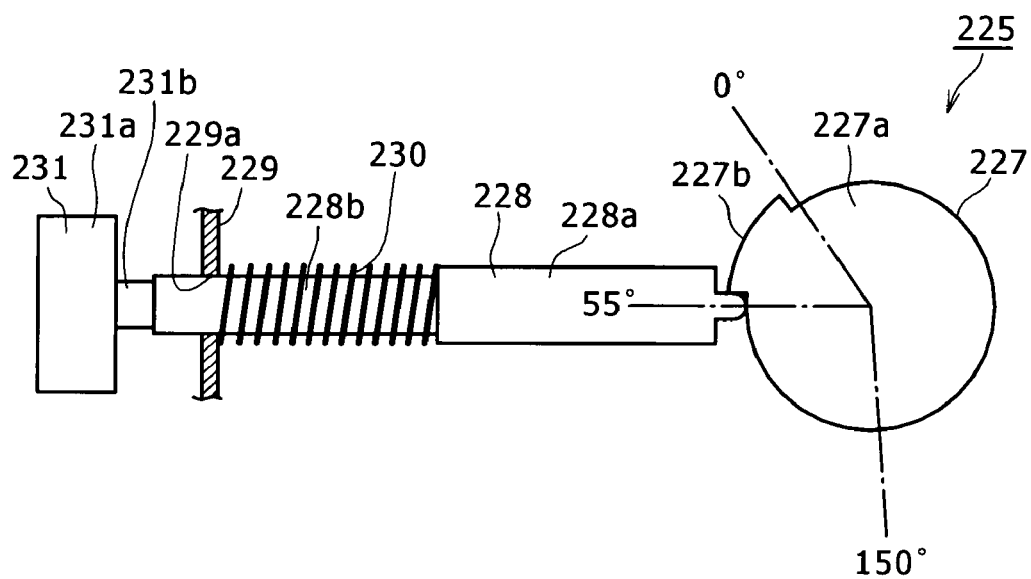
FIGS. 10A and 10B are enlarged side views of a state at a rotation angle of about 55°.
Figure 10B:
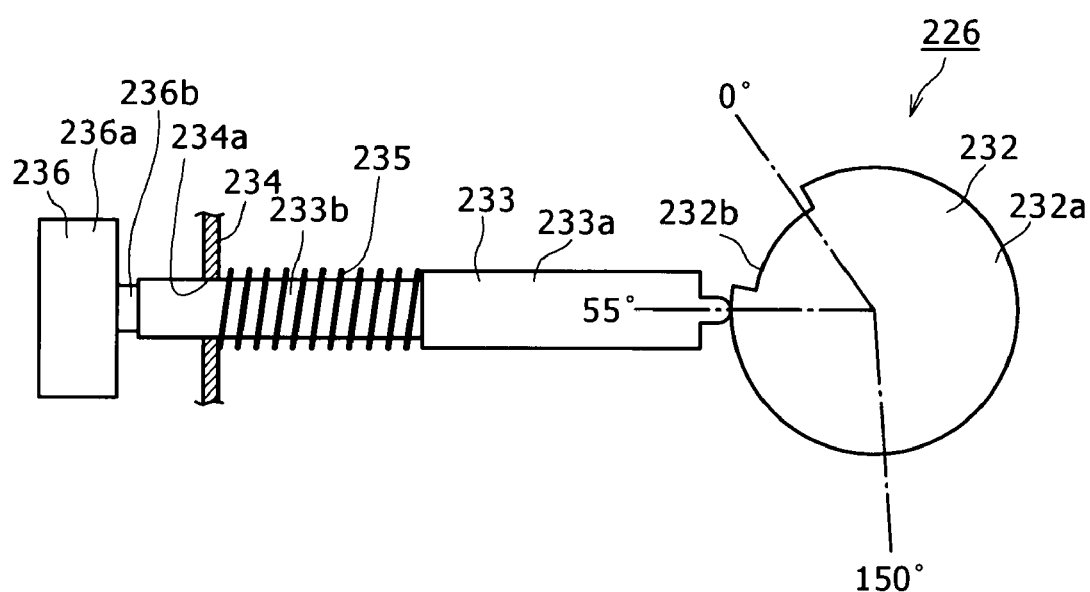

When the first casing 209 is further rotated toward the opened position, the opened/closed state detecting switch 231 is set in an OFF state at a rotation angle of about 55° (see FIG. 10 and FIG. 12). Incidentally, the rotation of the first casing 209 from the state of the rotation angle of about 50° to the opened position is performed by hand.

When the opened/closed state detecting switch 231 is set in the OFF state, the first speaker 212 is set in an ON state and the second speaker 217 is set in an OFF state, so that an audio output destination is changed from the second speaker 217 to the first speaker 212.

Figure 11A:
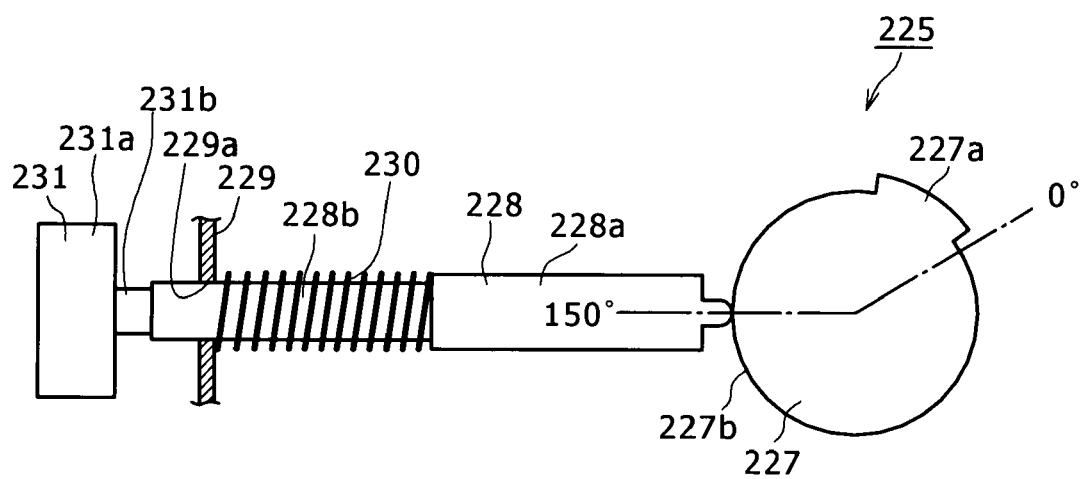
FIGS. 11A and 11B are enlarged side views would of a state at a rotation angle of about 150° (opened position)
Figure 11B:
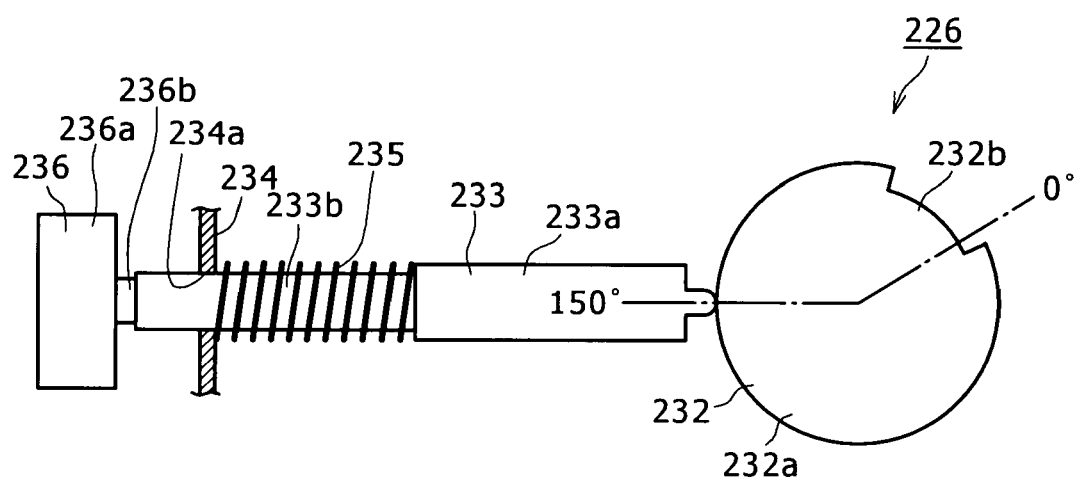
Figure 12:
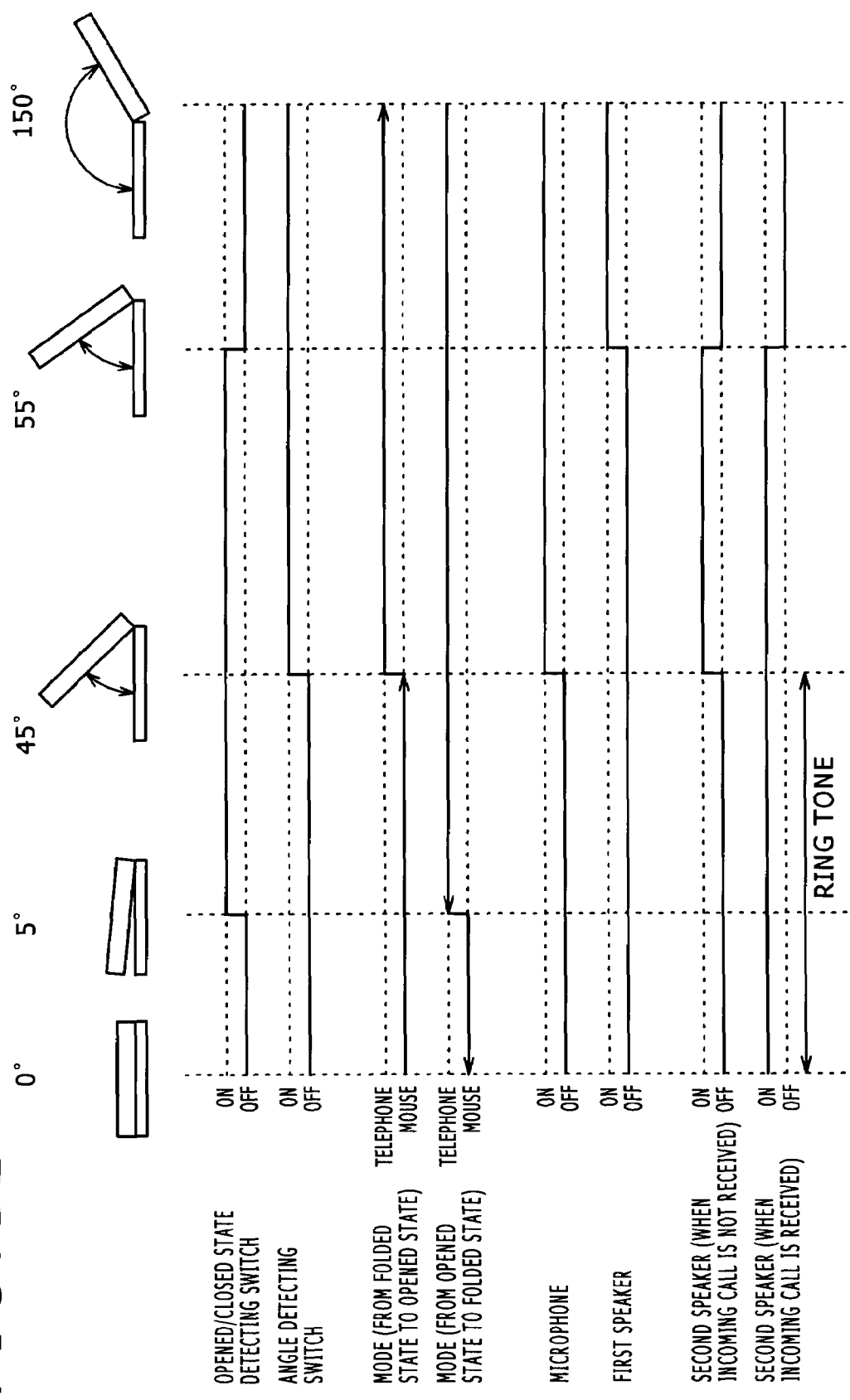
FIG. 12 is a chart diagram showing operation states of parts when the first casing is rotated with respect to the second casing.

After the first casing 209 is further rotated toward the opened position, the opened position is reached at a rotation angle of about 150° (see FIG. 11). At this time, voice is input to the microphone 220, and voice is output to the first speaker 212 (see FIG. 12), so that the user can for example use the mouse device 205 as a telephone in a similar state to that of a so-called folding portable telephone while holding the mouse device 205.

On the other hand, when the first casing 209 is rotated from the opened position (the rotation angle of about 150°) to the folded position, the opened/closed state detecting switch 231 is set in the ON state at the rotation angle of about 55° (see FIG. 12). Incidentally, all of the rotation of the first casing 209 from the opened position to the folded position is performed by hand.

When the opened/closed state detecting switch 231 is set in the ON state, the first speaker 212 is set in the OFF state and the second speaker 217 is set in the ON state, so that the audio output destination is changed from the first speaker 212 to the second speaker 217. The mouse device 205 is temporarily retained in a state of the rotation angle of about 50° (see FIG. 3) by a mechanism not shown in the figure.

When the first casing 209 is further rotated toward the folded position, the angle detecting switch 236 is set in the OFF state at the rotation angle of about 45° (see FIG. 12). At this time, the microphone 220 is set in the OFF state to disable audio input, and the second speaker 217 is set in the OFF state to disable audio output.

When the first casing 209 is further rotated toward the folded position, the opened/closed state detecting switch 231 is set in the OFF state at the rotation angle of about 5° (see FIG. 12). Thus, the opened/closed state detecting switch 231 and the angle detecting switch 236 are both set in the OFF state, and the mode of the mouse device 205 is switched from the telephone mode to the mouse mode. The user can therefore use the mouse device 205 as a mouse.

Incidentally, while the above description illustrates an example in which the microphone 220 and the second speaker 217 are set in the OFF state at the rotation angle of about 45° when the first casing 209 is rotated from the opened position to the folded position, the microphone 220 and the second speaker 217 can be set in the OFF state at the same time that the first casing 209 is rotated to the rotation angle of about 5° and that the mode of the mouse device 205 is changed from the telephone mode to the mouse mode.

After the first casing 209 is further rotated toward the folded position, the folded position is reached at the rotation angle of about 0°.

Incidentally, the mouse device 205 sets the driving state of the ball or the light emitting and receiving device for detecting the direction of movement and the speed of movement of the mouse device 205 to the ON state and enables use of the mouse device 205 as a mouse in the mouse mode.

As described above, the mouse device 205 changes between the mouse mode and the telephone mode according to the rotation angle of the first casing 209 with respect to the second casing 210 when the first casing 209 is rotated with respect to the second casing 210.

Hence, it is not necessary to attach the first casing to the second casing or detach the first casing from the second casing when switching is performed between mouse use and telephone use as in the conventional device, and it is possible to change the mode by a simple operation, thus improving usability.

In addition, since the audio output destination is changed between the first speaker 212 and the second speaker 217 according to the rotation angle of the first casing 209 with respect to the second casing 210, the mouse device 205 can be used as a telephone in such a manner as to be adapted to the mode of use of the mouse device 205 (the use of the mouse device 205 in the hands-free state and the use of the mouse device 205 in a held state similar to that of a portable telephone).

Further, since a state of use of the microphone 220 is changed according to the rotation angle of the first casing 209 with respect to the second casing 210, excellent functionality of the mouse device 205 as a mouse and a telephone can be ensured.

Incidentally, in the mouse device 205, the maximum output of audio from the second speaker 217 is set greater than the maximum output of audio from the first speaker 212. At the time of use of the mouse device 205 as a telephone, in general, the user listens to voice with the mouse device 205 at a distance from an ear in the so-called hands-free state when the voice is output to the second speaker 217, and the user holds the mouse device 205 and listens to voice with an ear to the mouse device 205 in a similar state to that of a so-called portable telephone when the voice is output to the first speaker 212. Hence, by setting the maximum output of audio from the second speaker 217 greater than the maximum output of audio from the first speaker 212, good conditions of use of the mouse device 205 as a telephone can be ensured regardless of use modes at different rotation angles.

The mouse device 205 performs switching between the mouse mode and the telephone mode at different rotation angles (the rotation angle of about 5° and the rotation angle of about 45°) according to a direction of rotation of the first casing 209 with respect to the second casing 210, that is, a direction of rotation from the folded position to the opened position and a direction of rotation from the opened position to the folded position.

Thus, even if the first casing 209 is accidentally rotated in a direction of opening with respect to the second casing 210 during use of the mouse device 205 as a mouse, good conditions of use of the mouse device 205 as a mouse can be ensured because the mouse device 205 is not changed to the telephone mode until the first casing 209 is rotated to a certain rotation angle (about 45°). In addition, even if the first casing 209 is accidentally rotated in a direction of closing with respect to the second casing 210 during use of the mouse device 205 as a telephone, communication is not stopped and good conditions of use of the mouse device 205 as a telephone can be ensured because the mouse device 205 is not changed to the mouse mode until the first casing 209 is rotated to a certain rotation angle (about 5°).

Incidentally, while the above description illustrates an example in which switching between the mouse mode and the telephone mode is performed at the different rotation angles according to the direction of rotation of the first casing 209 with respect to the second casing 210, switching between the mouse mode and the telephone mode may be performed at a same rotation angle irrespective of the direction of rotation of the first casing 209 with respect to the second casing 210.

In addition, each of the rotation angles of the first casing 209 with respect to the second casing 210 in relation to the ON-OFF control of the above-described parts is a mere example. The rotation angles in relation to the ON-OFF control of the parts can be set arbitrarily in a range of rotation angles between the folded position and the opened position.

Each of the concrete shapes and structures of the parts shown in the best mode described above is a mere example of embodiment in carrying out the present embodiment, and the technical scope of the present invention is not to be construed in a limited manner on the basis of these concrete shapes and structures of the parts shown in the best mode.

Examples of use of the mouse-integrated type handset 1 according to one embodiment of the present invention will next be described in brief with reference to FIGS. 13A and 13B. A computer apparatus 20 is for example a personal computer. The computer apparatus 20 supports USB and has a USB cable connecting terminal. Also, the computer apparatus 20 is capable of communication via the Internet. In addition, the computer apparatus 20 includes software for using an IP telephone in the mouse-integrated type handset 1. When the user uses the IP telephone in the mouse-integrated type handset 1, the user starts the software in advance, and connects the mouse-integrated type handset 1 to the computer apparatus 20 by a USB cable 13.

Figure 13A:
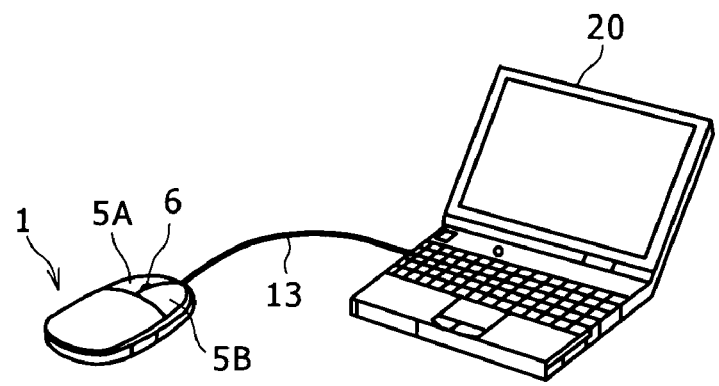
FIGS. 13A and 13B are diagrams of assistance in briefly explaining examples of use of the mouse-integrated type handset according to one embodiment of the present invention.

When the mouse-integrated type handset 1 is used as a mouse, as shown in FIG. 13A as an example, the casing of the mouse-integrated type handset 1 is closed, a side in which the optical sensor 7 is disposed is put on a flat place such for example as a mouse pad or a tabletop, and the mouse-integrated type handset 1 is moved. A signal indicating an amount of movement detected by the optical sensor 7 and a signal corresponding to an operation on the mouse buttons 5A and 5B and the wheel 6 are transmitted as mouse data to the computer apparatus 20 via the USB cable 13.

Figure 13B:
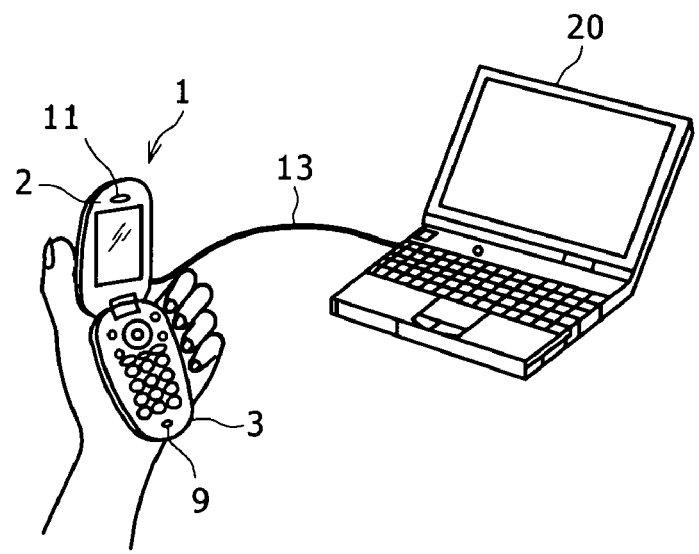

When the mouse-integrated type handset 1 is used as an IP telephone handset, as shown in FIG. 13B as an example, the user picks up the mouse-integrated type handset 1, opens the casing thereof, inputs the telephone number of another person with whom the user desires to have a telephone conversation from the key part 8, for example, and presses the call key to call the other person. A telephone number can also be input from the software included in the computer apparatus 20. The user brings the receiver 11 close to an ear and holds the transmitter 9 in a state that allows the sound of voice of the user to be collected, and thereby the user can have a telephone conversation by the mouse-integrated type handset 1.

Incidentally, the audio signal of the call is transmitted as digital audio signal via the USB cable 13. Similarly, an incoming call notification from the computer apparatus 20 and data input from the key part 8 and the like on the side of the mouse-integrated type handset 1 are transmitted via the USB cable 13. In addition, power is supplied from the computer apparatus 20 to the mouse-integrated type handset 1 via the USB cable 13.

When the casing of the mouse-integrated type handset 1 is opened, the mouse function of the mouse-integrated type handset 1 is disabled, and thus the mouse-integrated type handset 1 is not used as a mouse. For example, the functions of the mouse buttons 5A and 5B, the wheel 6, and the optical sensor 7 are disabled. When the call ending key is pressed and the casing of the mouse-integrated type handset 1 is closed, the mouse function is enabled, and thus the mouse-integrated type handset 1 can be used as a mouse. Examples of disabling the function of the optical sensor 7 include for example stopping power supply to the optical sensor 7, a CPU 74 refusing to receive an input signal from the optical sensor 7, the CPU 74 ignoring the input signal from the optical sensor 7, and refusing to transmit the input signal input from the optical sensor 7 to an external device.

Thus, in one embodiment of the present invention, the mouse and the handset are formed integrally with each other, and each of the functions of the mouse and the handset can be selected and used. Therefore, even when the user uses the IP telephone on the computer apparatus 20 configured to be of a portable type, for example, the user can obtain the function of a pointing device and the function of an IP telephone call by carrying the mouse-integrated type handset 1 together with the computer apparatus 20.

In addition, since the mouse-integrated type handset 1 has a function of generating a ring tone, the user can be informed of an IP telephone incoming call without wearing a headset or looking fixedly at the screen of the computer apparatus 20.

Figure 14:
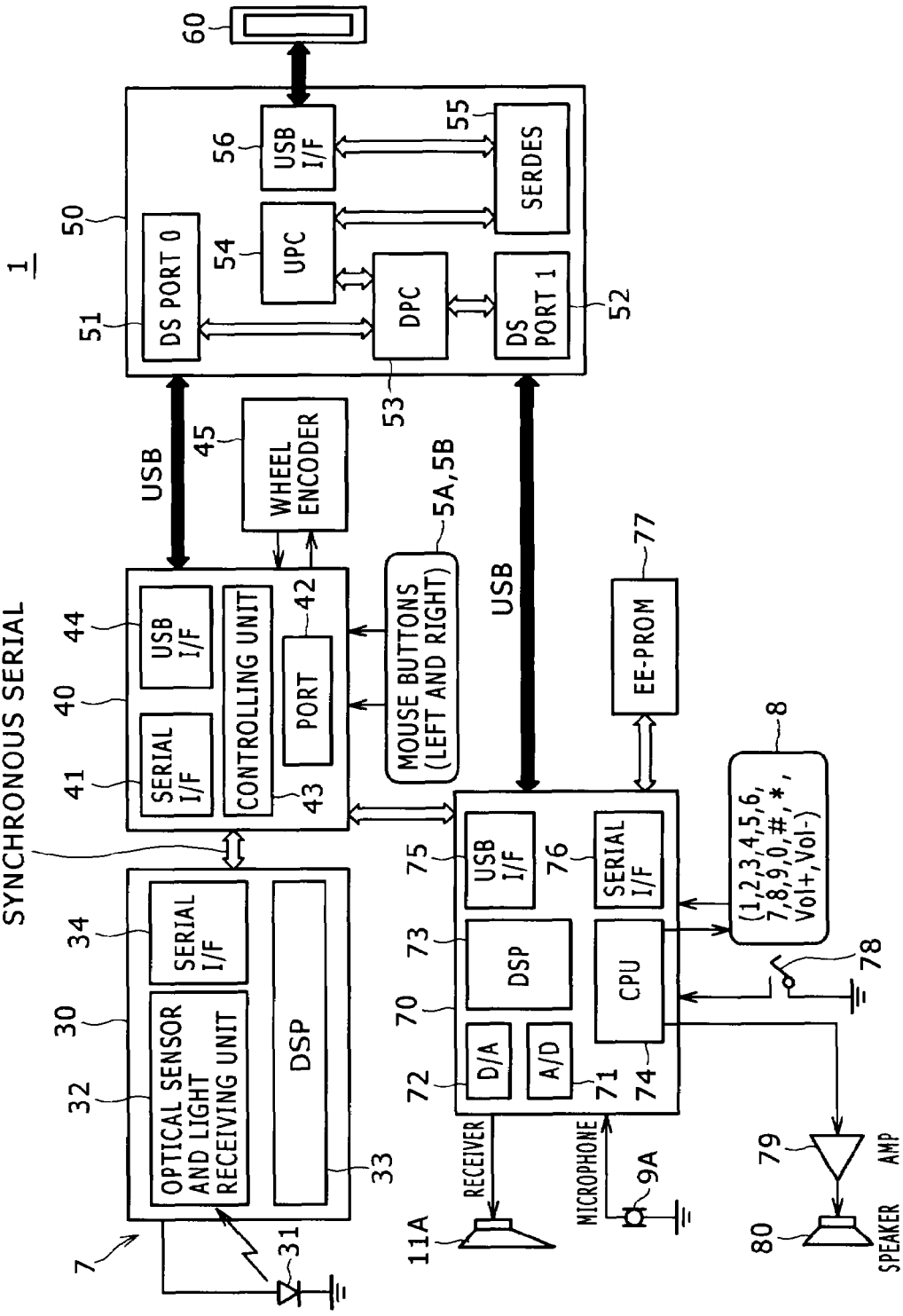
FIG. 14 is a block diagram showing an example of a configuration of the mouse-integrated type handset.

IP telephone communication using the mouse-integrated type handset 1 according to one embodiment of the present invention will next be described in more detail. FIG. 14 shows a configuration of an example of the mouse-integrated type handset 1. The mouse-integrated type handset 1 roughly includes an optical block 30, a data inputting unit 40, a USB hub unit 50, and an audio unit 70.

The optical block 30 has an LED 31 and an optical sensor and light receiving unit 32. The optical block 30 outputs an amount of movement of the mouse-integrated type handset 1. For example, the optical sensor and light receiving unit 32 receives reflected light of light emitted by the LED 31, and outputs the reflected light as an electric signal to supply the electric signal to a DSP 33. The DSP 33 determines a temporal change of the supplied signal on the basis of a predetermined clock, and calculates the amount of movement of the mouse-integrated type handset 1 on the basis of the determined temporal change. Movement amount information indicating the calculated amount of movement is supplied to a serial I/F 34 to be output as a synchronous serial signal.

The data inputting unit 40 is supplied with the movement amount information output as a synchronous serial signal from the optical block 30, and is also supplied with data corresponding to an operation on the mouse buttons 5A and 5B and the wheel 6. An output signal from the mouse buttons 5A and 5B is supplied to a port 42. A rotation of the wheel 6 is converted into a predetermined signal by a wheel encoder 45, and the signal is supplied to the port 42. The port 42 converts these input signals into predetermined data. On the other hand, the synchronous serial signal supplied from the optical block 30 is supplied to a serial I/F 41. The data converted by the port 42 and the synchronous serial signal supplied to the serial I/F 41 are controlled in a predetermined manner by a controlling unit 43 to be supplied to a USB I/F 44. The USB I/F 44 outputs mouse data composed of the signal and the data supplied to the USB I/F 44 using a USB interrupt transfer.

The audio unit 70 is a part in charge of the telephone function of the mouse-integrated type handset 1. The audio unit 70 has an A/D converting unit 71, a D/A converting unit 72, a DSP 73, and a CPU (Central Processing Unit) 74. The audio unit 70 is connected with an EEPROM (Electrically Erasable Programmable Read Only Memory) 77 storing a program for operation of the CPU 74. The CPU 74 controls the audio unit 70 according to the program. The CPU 74 can also control other parts of the mouse-integrated type handset 1. The CPU 74 can for example control power supply to the optical block 30 and the data inputting unit 40.

Further, the audio unit 70 has a USB I/F 75 for communication with the computer apparatus 20. A digital audio signal of an IP telephone call, a telephone function controlling signal output from the audio unit 70, and an incoming call notification signal from the computer apparatus 20, for example, are transmitted or received via the USB I/F 75. A serial I/F 76 is to communicate with each part corresponding to a serial interface within the mouse-integrated type handset 1.

The audio unit 70 is supplied with an output signal from the key part 8. When the auxiliary key part 10 is provided for the mouse-integrated type handset 1, an output signal from the auxiliary key part 10 is also supplied to the audio unit 70. The output signals from the key part 8 and the auxiliary key part 10 are supplied to the CPU 74.

The audio unit 70 is supplied with an output signal of a hook detecting switch 78. The output signal of the hook detecting switch 78 is supplied to the CPU 74. The hook detecting switch 78 is to detect an on-hook state and an off-hook state in the telephone function of the mouse-integrated type handset 1. The hook detecting switch 78 can use for example a switch structure for detecting the opened state and the closed state of the mouse-integrated type handset 1. The opened state of the casing of the mouse-integrated type handset 1 is the off-hook state, and the closed state of the casing of the mouse-integrated type handset 1 is the on-hook state.

The CPU 74 converts the output signals from the key part 8 and the auxiliary key part 10 and the output signal of the hook detecting switch 78 into a telephone function control signal for controlling the telephone function, and then supplies the telephone function control signal to the USB I/F 75. The USB I/F 75 outputs the telephone function control signal using a USB interrupt transfer, for example.

The audio unit 70 is connected with a microphone 9A forming the transmitter 9. The microphone 9A converts collected sound into an analog audio signal, and then inputs the analog audio signal to the audio unit 70. The analog audio signal is converted into a digital audio signal by the A/D converting unit 71, and the digital audio signal is supplied to the DSP 73. The DSP 73 performs predetermined processing on the digital audio signal according to an instruction from the CPU 74. The digital audio signal output from the A/D converting unit 71 is subjected to predetermined signal processing by the DSP 73, and then supplied to the USB I/F 75. The USB I/F 75 outputs the digital audio signal using a USB isochronous transfer.

A digital audio signal is supplied from the USB hub unit 50 to be described later to the audio unit 70 by an isochronous transfer, and received by the USB I/F 75. The USB I/F 75 passes the digital audio signal to the DSP 73. The digital audio signal is subjected to predetermined signal processing by the DSP 73, and then converted into an analog audio signal by the D/A converting unit 72. The analog audio signal is supplied to a speaker 11A forming the receiver 11.

The CPU 74 can further generate a predetermined audio signal using the DSP 73. For example, the CPU 74 receives an incoming call notification signal transmitted from the computer apparatus 20 via the USB I/F 75, and outputs an instruction to generate a ring tone for notifying an incoming call according to the received incoming call notification signal. The DSP 73 generates an audio signal according to the instruction. The generated audio signal is amplified by an amplifier 79, and then output from a speaker 80. Incidentally, the speaker 80 is provided separately from the speaker 11A for telephone reception.

The USB hub unit 50 performs a relay between a plurality of USB streams and one USB stream. In this example, the USB hub unit 50 has two ports on a downstream side. The downstream port 51 (DS port 0) is connected with the USB I/F 44 of the data inputting unit 40. The downstream port 52 (DS port 1) is connected with the USB I/F 75 of the audio unit 70. The downstream ports 51 and 52 are connected to a USB I/F 56 via a downstream port controller (DPC) 53 and an upstream controller (UPC) 54 for controlling downstream routing and upstream routing, respectively, for example, and a SERDES (Serializer and Deserializer) unit 55 for subjecting stream data to predetermined conversion processing and the like.

The USB I/F 56 is connected to an external computer apparatus via a USB connector 60. In this example, a USB cable 13 is connected to the USB connector 60, and the USB cable 13 is connected to a USB connector of the computer apparatus 20, whereby USB communication is enabled between the mouse-integrated type handset 1 and the computer apparatus 20.

Power to the mouse-integrated type handset 1 is supplied from the computer apparatus 20 via the USB cable 13 using a USB power supply function. Power is supplied from the computer apparatus 20 to the USB hub unit 50, and power is supplied to the data inputting unit 40 and the audio unit 70 connected to the USB hub unit 50 via the USB I/Fs. The optical block 30 is supplied with power from the data inputting unit 40.

Incidentally, as described with reference to FIGS. 1A to 1C, a display part 12 can be provided for the mouse-integrated type handset 1. For example, the audio unit 70 is provided with a graphic unit for converting a display control signal generated by the CPU 73 into a display signal in a format that can be displayed by the display part 12, which uses an LCD or the like as a display element. A display control signal generated in a predetermined manner by the CPU 73 is supplied to the graphic unit to be converted into a display signal in a predetermined format, and the display signal is supplied to the display part 12.

Conceivable as examples of information displayed on the display part 12 are a telephone number input by using the key part 8, a predetermined display corresponding to an input by the key part 8 or the auxiliary key part 10, and, at a time of an incoming telephone call, for example, the telephone number of a caller and the name of the caller. The name information of the caller can be displayed for example when the software for the IP telephone included in the computer apparatus 20 has a telephone directory function and the name corresponding to the telephone number of the caller is registered in the telephone directory. Displays on the display part 12 are not limited to these examples; for example, predetermined image data and moving image data can be displayed.

Further, the mouse-integrated type handset 1 can be provided with a camera function. Image data obtained by image pickup may be for example transferred to the computer apparatus 20 and then transmitted to a person at another end of a call.

Figure 15:
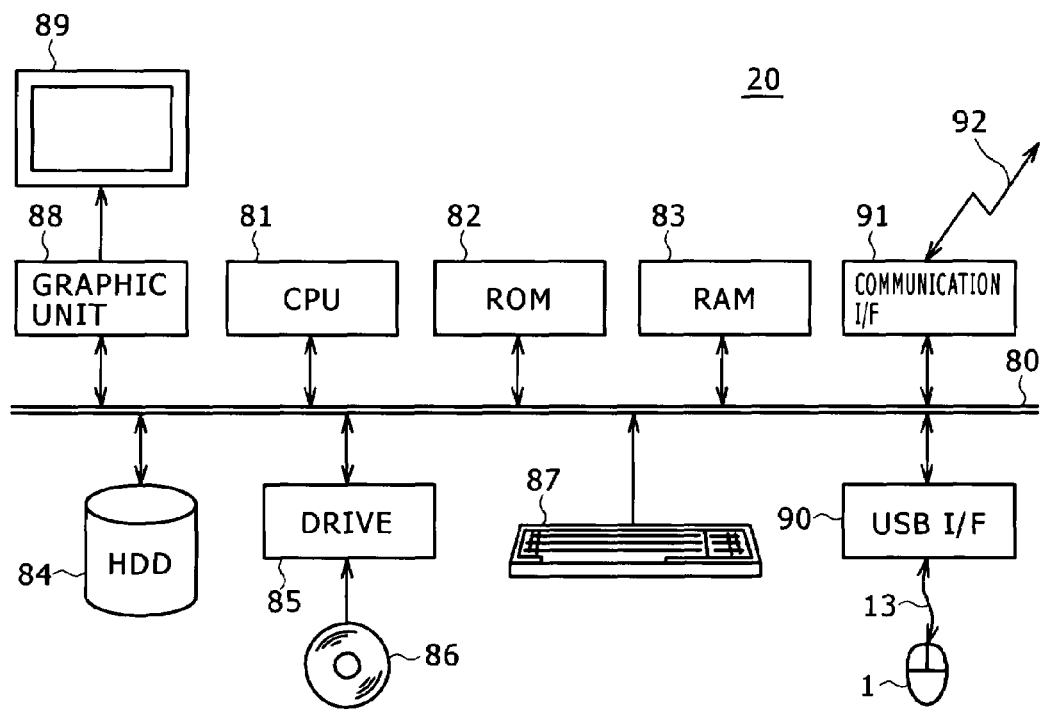
FIG. 15 is a block diagram schematically showing an example of a configuration of a computer apparatus.

FIG. 15 schematically shows a configuration of an example of the computer apparatus 20. A bus 80 is connected with a CPU 81, a ROM (Read Only Memory) 82, a RAM (Random Access Memory) 83, a hard disk drive (HDD) 84, and a drive device 85. The CPU 81 controls the operation of the computer apparatus 20 according to a program stored in advance in the hard disk drive 84 or the ROM 82. The RAM 83 is used as a work memory when the CPU 81 executes the program.

The above-described software for implementing the IP telephone by the mouse-integrated type handset 1 according to one embodiment of the present invention (the software will hereinafter be referred to as an IP telephone application) is stored as program data in the hard disk drive 84 in a predetermined manner. The CPU 81 for example reads the program data of the IP telephone application from the hard disk drive 84 in a predetermined manner in response to a predetermined operation of the computer apparatus 20, and expands the program data in the RAM 83. The CPU 81 reads the program data expanded in the RAM 83, and executes the program. The IP telephone application can also be automatically executed at a time of starting the computer apparatus 20.

The drive device 85 reads data recorded on a recording medium 86 such as a CD-ROM (Compact Disc-Read Only Memory), a DVD-ROM (Digital Versatile Disc-ROM) or the like. Data may be recorded on a recordable recording medium 86 such for example as a CD-R (Compact Disc-Recordable), a CD-RW (Compact Disc-ReWritable), a DVD-R (DVD Recordable), and a DVD-RW (DVD Re-recordable).

The bus 80 is further connected with a keyboard 87 and a graphic unit 88. The keyboard 87 outputs a signal corresponding to a key operation by a user. This signal is supplied to the CPU 81 via the bus 80 to be converted into character data in a predetermined manner. The graphic unit 88 converts a display control signal supplied from the CPU 81 into a signal in a format that can be displayed on a monitor 89 formed by an LCD, a CRT (Cathode Ray Tube) or the like.

The bus 80 is further connected with a USB I/F 90 and a communication I/F 91. The communication I/F 91 is connected to the Internet 92, and controls communication with the Internet 92. For example, IP telephone communication data is transmitted to and received from the Internet 92 under control of the communication I/F 91. The USB I/F 90 has a USB connector (not shown). The USB I/F 90 performs communication with a USB device connected to the USB connector by a protocol compliant with USB standards, and thereby performs data transfer and the like.

For example, the mouse-integrated type handset 1 according to one embodiment is connected to the USB I/F 90 by the USB cable 13. When the mouse-integrated type handset 1 is used as a mouse, mouse data output from the mouse-integrated type handset 1 is received by the USB I/F 90 via the USB cable 13, and then supplied from the USB I/F 90 to the CPU 81 via the bus 80. On the basis of the mouse data supplied to the CPU 81, the CPU 81 generates a display control signal for displaying a mouse cursor on the monitor 89, and performs various kinds of control.

When the mouse-integrated type handset 1 is used as a handset, a telephone function control signal corresponding to an input by the key part 8 or the auxiliary key part 10 of the mouse-integrated type handset 1 is received by the USB I/F 90 via the USB cable 13, and then supplied from the USB I/F 90 to the CPU 81 via the bus 80. On the basis of the telephone function control signal supplied to the CPU 81, the CPU 81 performs IP telephone communication control and the like according to the program of the IP telephone application.

Digital audio signals of an IP telephone call are also transferred via the USB cable 13 and transmitted and received by the USB I/F 90. In transmission, a digital audio signal transmitted from the mouse-integrated type handset 1 is received by the USB I/F 90 via the USB cable 13, supplied to the CPU 81 via the bus 80, and passed to the IP telephone application. According to the program of the IP telephone application, the CPU 81 for example transmits the supplied digital audio signal from the communication I/F 91 to the Internet 92.

In reception, an IP telephone digital audio signal transmitted from the Internet 92 is received by the communication I/F 91, supplied to the CPU 81 via the bus 80, and passed to the IP telephone application. According to the program of the IP telephone application, the CPU 81 transmits the supplied digital audio signal from the USB I/F 90 to the mouse-integrated type handset 1 via the USB cable 13.

The above-described IP telephone application recorded on the hard disk drive 84 is provided in a state of being recorded on the recording medium 86 such for example as a CD-ROM or a DVD-ROM. The IP telephone application is read from the recording medium 86 by the drive device 85, and recorded on the hard disk drive 84 in a predetermined manner. Not limited to this, the IP telephone application may be supplied from the Internet 92 via the communication I/F 91. Specifically, the program data of the IP telephone application downloaded in a predetermined manner from a server not shown in the figure on the Internet 92 according to an instruction of the CPU 81 is received by the communication I/F 91, and then recorded on the hard disk drive 84 in a predetermined manner.

Incidentally, a program stored in the EEPROM 77 within the mouse-integrated type handset 1 can be transferred and updated from the computer apparatus 20. For example, the computer apparatus 20 transmits a program supplied from the Internet 92 or the recording medium 86 from the USB I/F 90 to the mouse-integrated type handset 1 via the USB cable 13. The mouse-integrated type handset 1 receives the program in the USB hub unit 50, and then transmits the program from the downstream port 52 to the audio unit 70. The audio unit 70 receives the program in the USB I/F 75. The CPU 74 writes the received program to the EEPROM 77 in a predetermined manner, and updates the program within the EEPROM 77.

Figure 16:
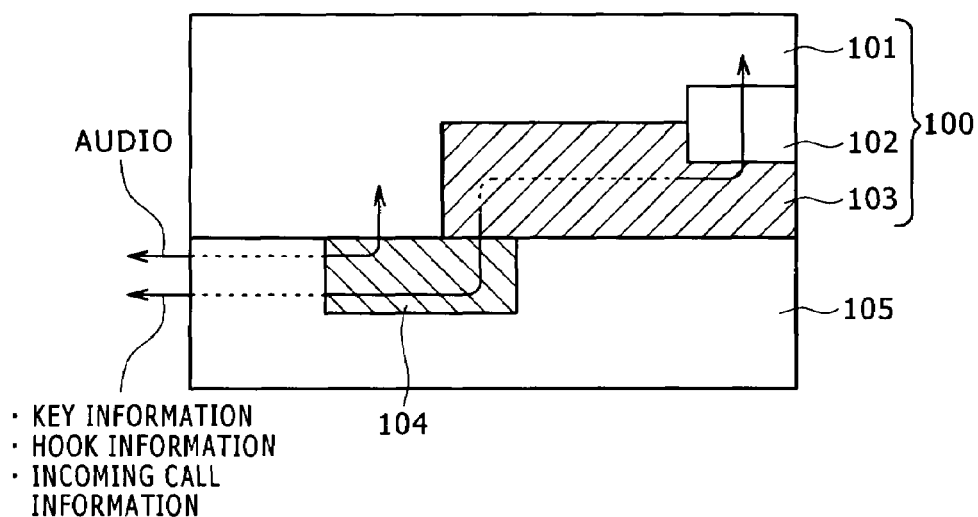
FIG. 16 is an architecture diagram showing an architecture of an example of software in the computer apparatus according to one embodiment of the present invention.

FIG. 16 shows an architecture of an example of software in the computer apparatus 20 according to one embodiment of the present invention. The IP telephone application 100 includes a telephone application part 101, an API part 102, and a converting part 103, and operates on an OS (Operating System) 105. The OS 105 has a general-purpose USB driver 104 for controlling USB communication. The API part 102 is an API (Application Programming Interface) for using the functions of the converting part 103 from the telephone application part 101.

The telephone application part 101 mainly performs IP telephone communication control. For example, the telephone application part 101 performs processing such as processing at times of transmitting and receiving a call, modulation and demodulation of digital audio signals for telephone conversation, and telephone directory management. The converting part 103 performs data conversion processing for transferring information between the general-purpose USB driver 104 and the telephone application part 101. That is, the converting part 103 is a kind of API for controlling the general-purpose USB driver 104 from the telephone application part 101.

A telephone function control signal transmitted from the mouse-integrated type handset 1 using an interrupt transfer is received by the general-purpose USB driver 104, and then passed to the converting part 103. The converting part 103 converts the received telephone function control signal into a format that can be interpreted by the telephone application part 101, and then passes the telephone function control signal to the telephone application part 101. A digital audio signal transmitted from the mouse-integrated type handset 1 using an isochronous transfer is received by the general-purpose USB driver 104, and then directly passed to the telephone application part 101.

The telephone application part 101 performs processing for an outgoing call, an incoming call, and telephone conversation by the IP telephone, for example, on the basis of the telephone function control signal received from the converting part 103. As an example, the telephone application part 101 issues a request for communication with the Internet 92 to the OS 105. In response to this request, the OS 105 controls the communication I/F 91 by a communication driver not shown in the figures to enable IP telephone communication via the Internet 92. The telephone application part 101 establishes a communication with an outgoing call destination via the Internet 92 by a predetermined procedure. The telephone application part 101 then transmits a digital audio signal received from the general-purpose USB driver 104 to the outgoing call destination via the Internet 92.

A digital audio signal transmitted from a person with whom telephone conversation is being held via the Internet 92 is received by the communication I/F 91, and then passed to the telephone application part 101 in a predetermined manner under control of the OS 105 and the like. The telephone application part 101 transmits this digital audio signal to the mouse-integrated type handset 1 via the USB cable 13 under control of the general-purpose USB driver 104.

In the case of an incoming call, for example, when the OS 105 or the like determines that a signal received via the Internet 92 is directed to the telephone application part 101, the signal is passed to the telephone application part 101. When the signal indicates an incoming call, the telephone application part 101 passes the signal to the converting part 103 to convert the signal into a format that can be interpreted by the mouse-integrated type handset 1. The converted signal is transmitted to the mouse-integrated type handset 1 via the USB cable 13 under control of the general-purpose USB driver 104.

Figure 17:
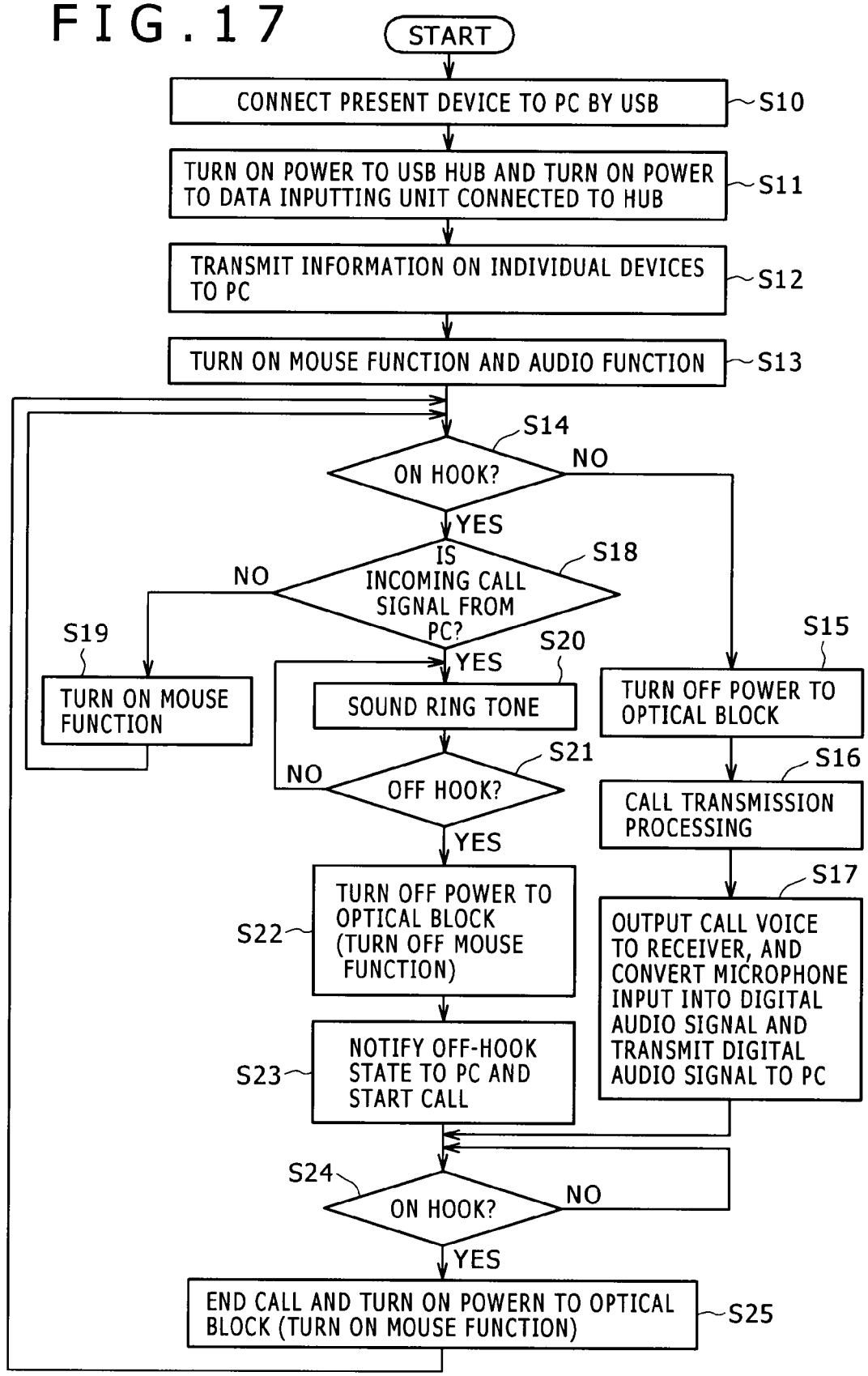
FIG. 17 is a flowchart representing an example of a process in the mouse-integrated type handset according to one embodiment of the present invention.

FIG. 17 is a flowchart representing an example of a process in the mouse-integrated type handset 1 according to one embodiment of the present invention. When the mouse-integrated type handset 1 and the computer apparatus 20 (described as a PC in FIG. 17) are connected to each other via the USB cable 13 (step S10), in next step S11, using a USB power supply function, power is supplied from the computer apparatus 20 to the USB hub unit 50, and power is supplied to the data inputting unit 40 and the audio unit 70 connected to the USB hub unit 50.

In next step S12, information on individual USB devices within the mouse-integrated type handset 1 is transmitted to the computer apparatus 20. Specifically, information on the USB hub unit 50, the data inputting unit 40, and the audio unit 70 as USB devices is transmitted to the computer apparatus 20 by a USB control transfer. This information is received by the general-purpose USB driver 104 of the computer apparatus 20, and the OS 105 of the computer apparatus 20 recognizes the individual USB devices within the mouse-integrated type handset 1. In next step S13, a mouse function and an audio function are turned on.

Each process or determination in step S14 and subsequent steps in the flowchart of FIG. 17 is performed by the CPU 74 according to a program.

In next step S14, whether the mouse-integrated type handset 1 is in the on-hook state is determined on the basis of the output signal of the hook detecting switch 78. For example, in the case of the mouse-integrated type handset 1, the closed state of the casing thereof is the on-hook state, and the opened state of the casing thereof is the off-hook state. When it is determined for example that the casing of the mouse-integrated type handset 1 is opened and that the mouse-integrated type handset 1 is in the off-hook state, the process proceeds to step S15.

In step S15, power to the optical block 30 is turned off, and the position detecting function of the mouse is disabled. In next step S16, a calling operation is performed. For example, a user operates the key part 8 to input the telephone number of a calling destination. The input telephone number information is transmitted to the computer apparatus 20, and then passed to the IP telephone application 100 via the general-purpose USB driver 104 and the converting part 103 in the computer apparatus 20. The IP telephone application 100 performs a predetermined calling process on the basis of the passed information.

When the telephone is connected to the calling destination according to the calling process, audio processing for telephone conversation is performed in step S17. Specifically, a digital audio signal transmitted from the calling destination is received by the computer apparatus 20, and then transmitted from the IP telephone application 100 to the mouse-integrated type handset 1 via the general-purpose USB driver 104. The digital audio signal is received by the USB hub unit 50 in the mouse-integrated type handset 1, and then supplied to the audio unit 70. The audio unit 70 subjects the supplied digital audio signal to predetermined signal processing, and converts the resulting digital audio signal into an analog audio signal in the D/A converting unit 72. The audio unit 70 then supplies the analog audio signal to the speaker 11A.

In addition, the audio unit 70 converts an analog audio signal output from the microphone 9A into a digital audio signal in the A/D converting unit 71, performs predetermined signal processing on the digital audio signal, and then outputs the digital audio signal. This digital audio signal is transmitted from the USB hub unit 50 to the computer apparatus 20. In the computer apparatus 20, the digital audio signal is received by the general-purpose USB driver 104, and then passed to the IP telephone application 100. The IP telephone application 100 subjects the received digital audio signal to predetermined processing, and then transmits the digital audio signal to the call destination.

When it is determined in the above-described step S14 that the mouse-integrated type handset 1 is in the on-hook state, on the other hand, the process proceeds to step S18, where whether an incoming call signal notifying an incoming call is transmitted from the computer apparatus 20 is determined. When no incoming call signal is transmitted and it is therefore determined that there is no incoming call, the process proceeds to step S19. In step S19, when the mouse function is off at this point in time, the mouse function is turned on to allow the mouse-integrated type handset 1 to be used as a mouse. The process returns to step S14.

When it is determined in the above-described step S18 that an incoming call signal is transmitted from the computer apparatus 20, the process proceeds to step S20. In step S20, the audio unit 70 generates an incoming call audio in response to the notification of the incoming call signal. The incoming call audio is supplied to the speaker 80 via the amplifier 79.

When for example the user opens the casing of the mouse-integrated type handset 1 in response to the ring tone and thereby sets the mouse-integrated type handset 1 in the off-hook state (step S21), in next step S22, the power to the optical block 30 is turned off, and the mouse function is turned off. After the mouse function is turned off, in next step S23, the off-hook state is notified to the computer apparatus 20, and a call is started as in the process of the above-described step S17.

When the on-hook state is detected (step S24) and the call is ended, the power to the optical block 30 is turned on and the mouse function is turned on (step S25). The process then returns to step S14.

In step S15 and step S22 described above, the power to the optical block 30 is turned off when the mouse-integrated type handset 1 is set in the off-hook state and thus the mouse function is not used. It is thereby possible to reduce power consumption when the handset function of the mouse-integrated type handset 1 is used and the mouse function is not used.

When the power to the optical block 30 is turned off and the mouse function is set in an OFF state, the mouse appears to be disconnected from the computer apparatus 20 side as a result of control of the general-purpose USB driver 104. Therefore, even when the user accidentally operates the mouse button 5A or 5B or the wheel 6, for example, no reaction occurs in the computer apparatus 20, and the computer apparatus 20 does not perform an unexpected operation.

Incidentally, while in the above description, the turning on/off of the mouse function is controlled by the turning on/off of the power to the optical block 30, this is not limited to this example. The turning on/off of the mouse function may be controlled by the turning on/off of the power to the data inputting unit 40, or may be controlled by the turning on/off of both the power to the optical block 30 and the power to the data inputting unit 40.

Figure 18:
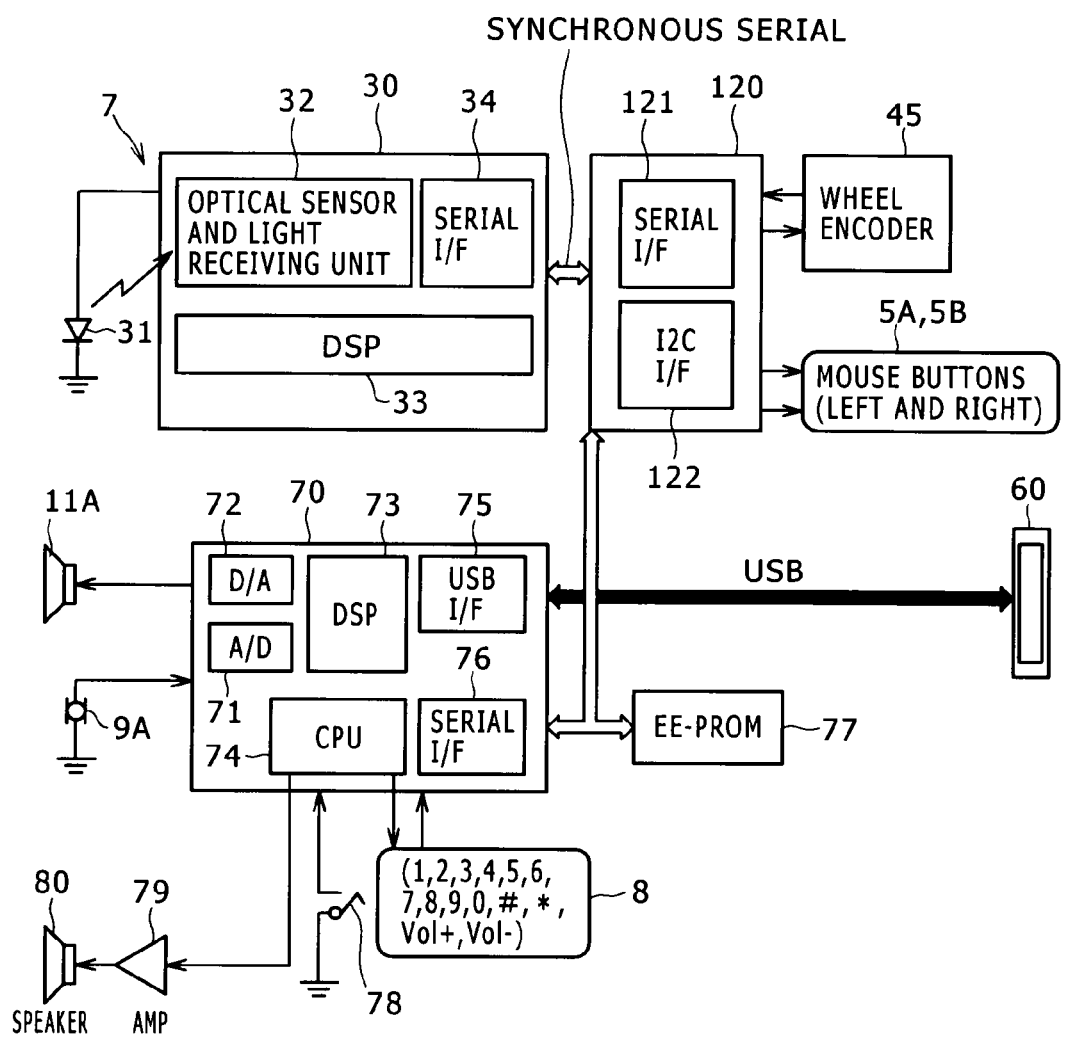
FIG. 18 is a block diagram showing an example of configuration of a mouse-integrated type handset 1' according to a modification of one embodiment of the present invention.
Figure 19:
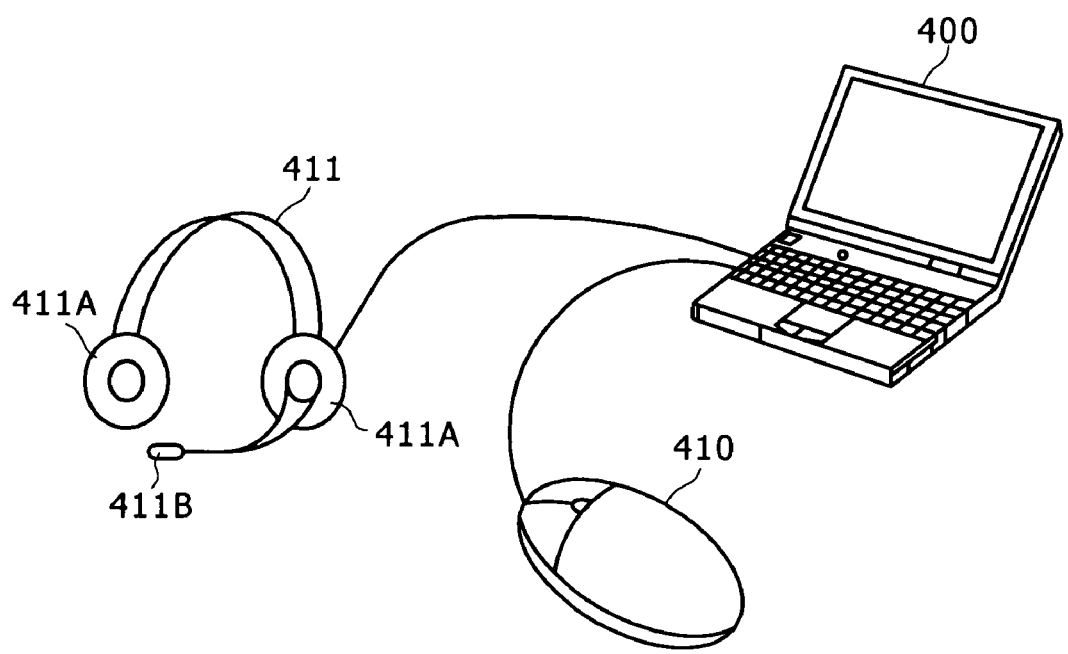
FIG. 19 is a schematic diagram of assistance in explaining an example of use of the IP telephone using a personal computer.

A modification of one embodiment of the present invention will next be described. FIG. 18 shows an example of configuration of a mouse-integrated type handset 1' according to the modification of one embodiment of the present invention. Incidentally, in FIG. 18, parts common to FIG. 18 and FIG. 14 described above are identified by the same reference numerals, and detailed description thereof will be omitted. The mouse-integrated type handset 1' according to the modification of one embodiment of the present invention is formed by omitting the USB hub unit 50, the controlling unit 43 for mouse control, and the like in the mouse-integrated type handset 1 described with reference to FIG. 14.

In the case of the mouse-integrated type handset 1', an output of an optical block 30 and outputs of mouse buttons 5A and 5B and a wheel encoder 45 are supplied to a general-purpose CPU 120, and these outputs processed in a predetermined manner by the CPU 120 are supplied as mouse data to a CPU 74 in an audio unit 70.

More specifically, movement amount information output as a synchronous serial signal from a serial I/F 34 of the optical block 30 is received by a serial I/F 121, and then passed to the CPU 120. The outputs of the mouse buttons 5A and 5B and the wheel encoder 45 are supplied to the CPU 120 to be converted into predetermined data. The CPU 120 serially transfers these pieces of data as mouse data from an I2C I/F 122 to a serial I/F 76 in the audio unit 70 to supply the mouse data to the CPU 74. The CPU 74 controls, in a predetermined manner, the mouse data output from the CPU 120, a digital audio signal associated with processing of the audio unit 70, and information indicating an on-hook state and an off-hook state, and supplies the mouse data output from the CPU 120, the digital audio signal associated with the processing of the audio unit 70, and the information indicating the on-hook state and the off-hook state to a USB I/F 75.

The USB I/F 75 is directly connected to a USB connector 60. The data supplied to the USB I/F 75 is transmitted to the computer apparatus 20, for example, via the USB connector 60. Incidentally, the CPU 120 reads a program stored in advance in an EEPROM 77 via the I2C I/F 122, and controls these operations according to the read program.

In this configuration, the mouse-integrated type handset 1' has one USB I/F, and there is one device as a USB device. However, when the mouse-integrated type handset 1' according to the modification of one embodiment of the present invention is to be controlled in a manner similar to the operation of the mouse-integrated type handset according to the foregoing embodiment already described with reference to FIG. 17, a mouse function and an audio function need to be controlled separately from each other.

For this, it suffices to provide a driver on the computer apparatus 20 side which driver can recognize the mouse-integrated type handset 1' as a composite type device combining a mouse device and an audio device. For example, the above-described general-purpose USB driver 104 is replaced with the driver capable of recognizing the composite device. At this time, it can be considered that the mouse data is put in an empty end-point buffer of the USB I/F 75 and then transmitted to the computer apparatus 20.

The modification of the embodiment can reduce cost because the USB hub unit 50 in the mouse-integrated type handset according to the foregoing embodiment is omitted.

It is to be noted that while the present invention is applied to the IP telephone in the above description, the present invention is not limited to this example. For example, the present invention is also applicable to handsets used for the Internet telephone that allows a telephone call to be made using the Internet.

In addition, while the mouse-integrated type handset 1 and the computer apparatus 20 are connected to each other by wire using USB interfaces in the above description, the present invention is not limited to this example. Interfaces applicable to the present invention are not limited to USB interfaces, and other interfaces may be used as long as the other interfaces can transfer mouse data and transfer digital audio signals. Further, the connection between the mouse-integrated type handset 1 and the computer apparatus 20 is not limited to wire connection, and may be wireless connection as long as a band in which digital audio signals can be transmitted is secured.

Further, while in the above description, the mouse-integrated type handset 1 has the key part 8 to allow a telephone number to be input from the key part 8, the present invention is not limited to this example. That is, it is possible to omit the key part 8 from the mouse-integrated type handset 1, and input a telephone number on the side of the IP telephone application 100.

Further, while a calling process can be performed by using the mouse-integrated type handset 1 in the above description, the present invention is not limited to this example. That is, the mouse-integrated type handset 1 may be used only for receiving a call, and the mouse-integrated type handset 1 may be configured not to perform a calling operation. In this case, a calling process is performed on the side of the IP telephone application 100. Specifically, at a time of calling, for example, the mouse-integrated type handset 1 is taken in a hand, the casing of the mouse-integrated type handset 1 is opened, and the mouse-integrated type handset 1 is held in a state that allows telephone conversation. A telephone number is input to the IP telephone application 100 and a calling operation is performed on the IP telephone application 100. The key part 8 is omitted when the mouse-integrated type handset 1 is used only for receiving calls.

It should be understood by those skilled in the art that various modifications, combinations, sub-combinations and alterations may occur depending on design requirements and other factors insofar as they are within the scope of the appended claims or the equivalents thereof.

What is claimed is:

1. An audio communication apparatus comprising:
a communication unit configured to communicate with an external device;
an input unit configured to input an operating signal for operating the external device;
a microphone configured to collect sound;
a first speaker configured to output sound;
a control unit configured to transmit the sound input from said microphone to the external device via said communication unit and transmit an audio signal received via said communication unit to said first speaker, and configured to be connected to said input unit and control enabling and disabling of a function of said input unit;
a first structure part in which said first speaker is disposed;
a second structure part in which said microphone is disposed; and
an opened/closed state detecting mechanism configured to detect if an angle between the first structure part and said second structure part is between a first value and a second value;
an angle detecting mechanism configured to determine if the angle between the first structure part and said second structure part is greater than a third value;
a hinge part configured to movably join said first structure part and said second structure part to each other,
wherein said first structure part and said second structure part are joined to each other so as to be able to be opened and closed with said hinge part as a pivot such that a lower surface of said first structure part and an upper surface of said second structure part are facing one another when closed,
and the control unit is configured to set the audio communication apparatus in a mouse mode when the angle between the first structure part and the second structure part of the audio communication apparatus is closed to less than the first value, the control unit is configured to set the audio communication apparatus in a telephone mode when the angle between the first structure part and the second structure part of the audio communication apparatus is opened to greater than the third value, the control unit is configured to enable the microphone when the angle is greater than the third value, the control unit is configured to enable the first speaker when the angle is greater than the second value, and the third value is greater than the first value and less than the second value.

2. The audio communication apparatus as claimed in claim 1, wherein said control unit disables the function of said input unit when an audio signal communication is started.

3. The audio communication apparatus as claimed in claim 2, wherein said control unit turns off power supply to said input unit when the audio signal communication is started.

4. The audio communication apparatus as claimed in claim 2, wherein said control unit enables the function of said input unit when the audio signal communication is ended.

5. The audio communication apparatus as claimed in claim 1, wherein said control unit disables the function of said input unit when said first structure part and said second structure part are moved from a folded position to an opened position greater than third value.

6. The audio communication apparatus as claimed in claim 5, wherein said control unit enables the function of said input unit when said first structure part and said second structure part are moved from the opened position to the folded position less than first value.

7. The audio communication apparatus as claimed in claim 5, wherein said audio communication apparatus further includes a second speaker disposed in an external surface of said first structure part; said first speaker is disposed in a surface of said first structure part, the surface of said first structure part being opposed to said second structure part; and said control unit makes the audio signal received via said communication unit output from said second speaker at a predetermined angle at an intermediate position during movement of said first structure part and said second structure part from the opened position to the folded position.

8. The audio communication apparatus as claimed in claim 5, wherein said audio communication apparatus further includes a second speaker disposed in an external surface of said first structure part; said first speaker is disposed in a surface of said first structure part, the surface of said first structure part being opposed to said second structure part; and said control unit makes the audio signal received via said communication unit output from said speaker and stops output of said audio signal from said second speaker at a predetermined angle at an intermediate position during movement of said first structure part and said second structure part from the opened position to the folded position greater than third value.

9. The audio communication apparatus as claimed in claim 1, wherein said input unit includes a position detecting unit for detecting a position of said audio communication apparatus and a button input unit for pressing input of an operating signal; and said position detecting unit is disposed in one of said first structure part and said second structure part, and said button input unit is disposed in the other.

10. The audio communication apparatus as claimed in claim 1, wherein said control unit disables the function of said input unit when said first structure part and said second structure part are opened.

11. The audio communication apparatus as claimed in claim 1, further comprising an audio generating unit for generating audio data, wherein said control unit makes the audio data output to an outside when a notification that the audio signal is received from the external device via said communication unit.

12. The audio communication apparatus as claimed in claim 11, further comprising a ring tone speaker for outputting the audio data generated by said audio generating unit, wherein said control unit makes the audio data output via said ring tone speaker when the notification that the audio signal is received from the external device via said communication unit.

13. The audio communication apparatus as claimed in claim 1, further comprising a data inputting unit for inputting data, wherein said control unit sets a destination of communication via a network on a basis of the data input by said data inputting unit.

14. The audio communication apparatus as claimed in claim 1, wherein the opened/closed state detecting mechanism includes a first cam configured to rotate with respect to a first shaft as the first structure part rotates with respect to said second structure part, said first cam configured to engage an end of said first shaft and move the first shaft based on the angle between said first structure part and said second structure part.

15. The audio communication apparatus as claimed in claim 14, wherein the angle detecting mechanism includes a second cam configured to rotate with respect to a second shaft as the first structure part rotates with respect to said second structure part, said second cam configured to engage an end of said second shaft and move the second shaft based on the angle between said first structure part and said second structure part.

16. An audio communication method of an audio communication apparatus in which a signal for operating an external device is input in a first mode and which performs audio communication in a second mode, said audio communication method comprising:
  inputting a signal for operating the external device to enter the first mode;
  starting an audio signal communication;
  detecting if an angle between a first structure part and a second structure part is between a first value and a second value;
  determining if the angle between a first structure part and a second structure part is greater than a third value;
  enabling a microphone when the angle is greater than the third value;
  enabling a speaker when the angle is greater than the second value;
  disabling the inputting of the signal for operating said external device when the angle between the first structure part and the second structure part of the audio communication apparatus is opened to greater than the third value to enter the second mode; and
  enabling the inputting of the signal for operating said external device when the angle between the first structure part and the second structure part of the audio communication apparatus is closed to less than the first value to reenter the first mode,
  wherein the third value is greater than the first value and less than the second value.

17. The audio communication method as claimed in claim 16, wherein said audio communication apparatus includes the first structure part in which the speaker is disposed, the second structure part in which the microphone is disposed, and a hinge part for movably joining said first structure part and said second structure part to each other, said first structure part and said second structure part having a structure such that said first structure part and said second structure part are joined to each other so as to be able to be opened and closed with said hinge part as a pivot; and said audio signal communication is started when said first structure part and said second structure part are moved from a folded position to an opened position.

* * * * *